(12) United States Patent
Howes et al.

(10) Patent No.: US 9,658,004 B2
(45) Date of Patent: May 23, 2017

(54) LAYERED THERMAL STORE WITH SELECTIVELY ALTERABLE GAS FLOW PATH

(75) Inventors: Jonathan Sebastian Howes, Hampshire (GB); James Macnaghten, Hampshire (GB); Rowland Geoffrey Hunt, Hampshire (GB)

(73) Assignee: Energy Technologies Institute LLP, Loughborough (GB)

( * ) Notice: Subject to any disclaimer, the term of this patent is extended or adjusted under 35 U.S.C. 154(b) by 575 days.

(21) Appl. No.: 14/006,635

(22) PCT Filed: Aug. 24, 2011

(86) PCT No.: PCT/GB2011/051595
§ 371 (c)(1),
(2), (4) Date: Sep. 20, 2013

(87) PCT Pub. No.: WO2012/127178
PCT Pub. Date: Sep. 27, 2012

(65) Prior Publication Data
US 2014/0014290 A1    Jan. 16, 2014

(30) Foreign Application Priority Data
Mar. 23, 2011   (GB) .................................. 1104867.5

(51) Int. Cl.
*F28F 27/00* (2006.01)
*F28F 13/06* (2006.01)
(Continued)

(52) U.S. Cl.
CPC .............. *F28F 13/06* (2013.01); *F28D 19/00* (2013.01); *F28D 20/0056* (2013.01);
(Continued)

(58) Field of Classification Search
CPC ..... F28D 2020/0004; F28D 2020/0008; F28D 2020/0013; F28D 2020/0017;
(Continued)

(56) References Cited

U.S. PATENT DOCUMENTS

| 4,124,061 A | 11/1978 | Mitchell et al. |
| 4,190,099 A | 2/1980 | Despois et al. |
(Continued)

FOREIGN PATENT DOCUMENTS

| AT | 118225 | 6/1930 |
| CN | 201110594 Y | 9/2008 |
(Continued)

OTHER PUBLICATIONS

Friedrich, Roth, Aug. 16, 2001 (DE 10005937 A1).*
(Continued)

*Primary Examiner* — Travis Ruby
(74) *Attorney, Agent, or Firm* — Lempia Summerfield Katz LLC

(57) ABSTRACT

Heat storage apparatus comprising at least one thermal store (300) comprising a chamber (301) having a gas inlet (306), a gas outlet (307), and a gas-permeable thermal storage media (303) disposed therebetween, the apparatus being configured such that, during operation, the flow path of a gas flowing through the chamber (301) from inlet (306) to outlet (307) for transfer of thermal energy to or from the storage media (303) can be selectively altered in response to the progress of the thermal transfer, thereby enabling the flow path to bypass inactive upstream or downstream regions of the storage media where thermal transfer is complete or minimal, so as to minimize the pressure drop across the storage media. A baffle system (305) in a main flow passageway (312) may be used to control the gas flow path.

20 Claims, 17 Drawing Sheets

(51) Int. Cl.
*F28D 20/00* (2006.01)
*F28D 19/00* (2006.01)
*F28F 9/22* (2006.01)

(52) U.S. Cl.
CPC ............... *F28D 2020/006* (2013.01); *F28D 2020/0013* (2013.01); *F28D 2020/0026* (2013.01); *F28F 2009/226* (2013.01); *Y02E 60/142* (2013.01)

(58) Field of Classification Search
CPC ......... F28D 2020/0021; F28D 20/0056; F28D 20/02; F28D 20/028; F28D 19/02; F28D 21/0003; F28F 27/00; F28F 27/006; F28F 2009/226; F24H 7/04; F23L 15/02
USPC ......... 165/7, 9.1, 9.4, 10, 96, 103, 200, 205, 165/206, 236, 287, 288, 296, 297, 902, 165/909, DIG. 33, DIG. 37
See application file for complete search history.

(56) References Cited

U.S. PATENT DOCUMENTS

| | | | |
|---|---|---|---|
| 4,215,553 | A | 8/1980 | Poirier et al. |
| 4,283,914 | A | 8/1981 | Allen |
| 4,291,750 | A | 9/1981 | Clyne et al. |
| 4,405,010 | A * | 9/1983 | Schwartz ............ F28D 20/0056 165/10 |
| 4,524,756 | A | 6/1985 | Laverman |
| 4,607,424 | A | 8/1986 | Johnson |
| 5,615,738 | A * | 4/1997 | Cameron ................ F28F 9/22 165/103 |
| 8,554,377 | B2 | 10/2013 | Mathur et al. |
| 2006/0201163 | A1 | 9/2006 | Haefner et al. |
| 2008/0066736 | A1 | 3/2008 | Zhu |
| 2008/0210218 | A1 | 9/2008 | Hanel |
| 2009/0020264 | A1 | 1/2009 | Morita et al. |
| 2010/0176602 | A1 | 7/2010 | Shinnar |
| 2010/0230075 | A1 | 9/2010 | Mathur et al. |
| 2012/0018116 | A1 | 1/2012 | Mathur et al. |
| 2012/0279679 | A1* | 11/2012 | Soukhojak ......... B60H 1/00492 165/10 |

FOREIGN PATENT DOCUMENTS

| | | |
|---|---|---|
| DE | 447615 | 7/1927 |
| DE | 2419778 | 9/1975 |
| DE | 10005937 A1 | 8/2001 |
| EP | 1857614 B1 | 3/2010 |
| FR | 550938 | 3/1923 |
| JP | 56053392 | 5/1981 |
| JP | 61-262592 A | 11/1986 |
| JP | 4-272458 A | 9/1992 |
| JP | 6-185411 A | 7/1994 |
| JP | 7-98189 A | 4/1995 |
| JP | 2002-39694 A | 2/2002 |
| JP | 2003-166752 A | 6/2003 |
| JP | 2009-299920 A | 12/2009 |
| WO | 9005271 | 5/1990 |
| WO | 2009044139 A2 | 4/2009 |
| WO | 2009082713 A1 | 7/2009 |
| WO | 2009103106 A2 | 8/2009 |
| WO | 2010060524 A1 | 6/2010 |
| WO | 2011104556 A2 | 9/2011 |
| WO | 2012020233 A2 | 2/2012 |
| WO | 2012020234 A2 | 2/2012 |
| WO | 2012150969 A1 | 11/2012 |
| WO | 2013015834 A1 | 1/2013 |

OTHER PUBLICATIONS

Non-Final Office Action in U.S. Appl. No. 14/006,621, dated Jun. 17, 2015.

D.M. Crandall et al., "Segmented Thermal Storage", 2004, pp. 435-440, Solar Energy 77.

International Search Report and Written Opinion in International Application No. PCT/GB2011/051596, Jan. 26, 2012, 11 pages.

International Search Report and Written Opinion in International Patent Application No. PCT/GB2011/051595, Mar. 20, 2012, 12 pages.

Third Party Observation in International Patent Application No. PCT/GB2011/051595, Jul. 4, 2013, 2 pages.

Third Party Observation in International Patent Application No. PCT/GB2011/051596, Jul. 4, 2013, 2 pages.

\* cited by examiner

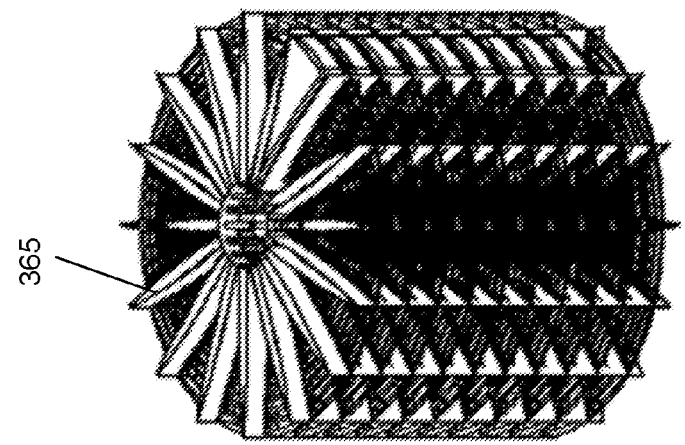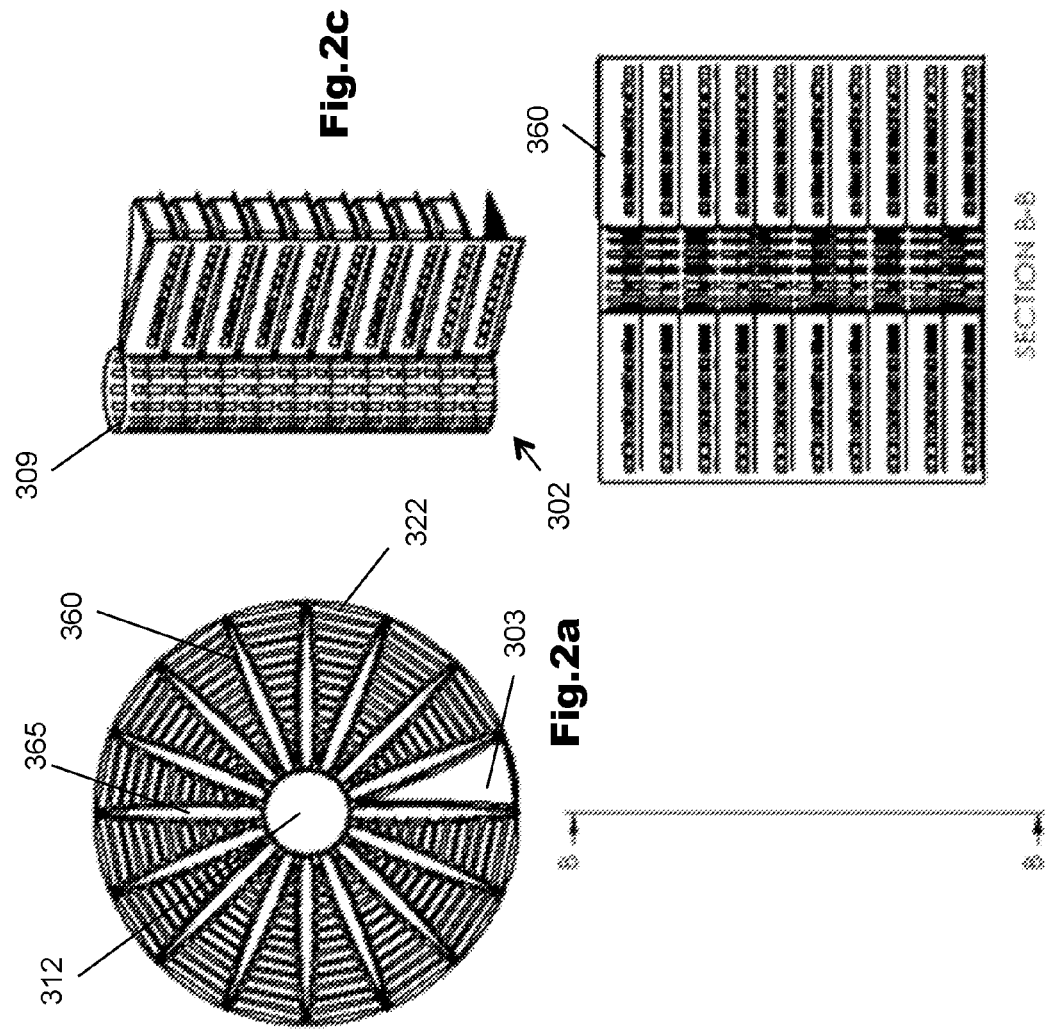

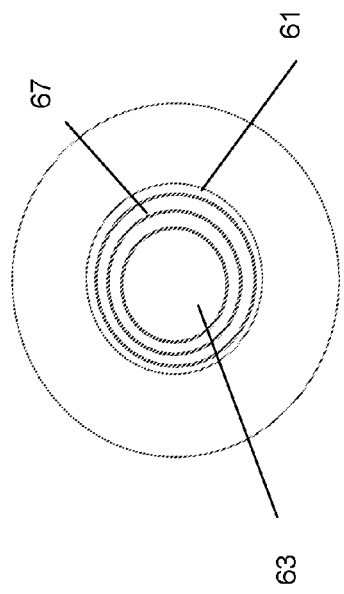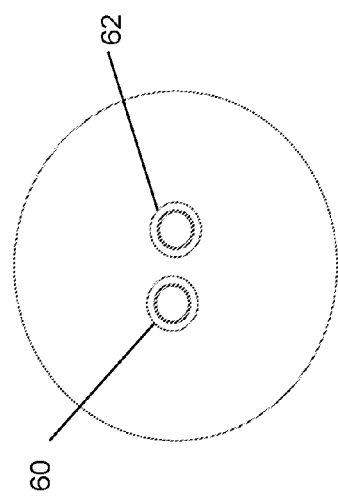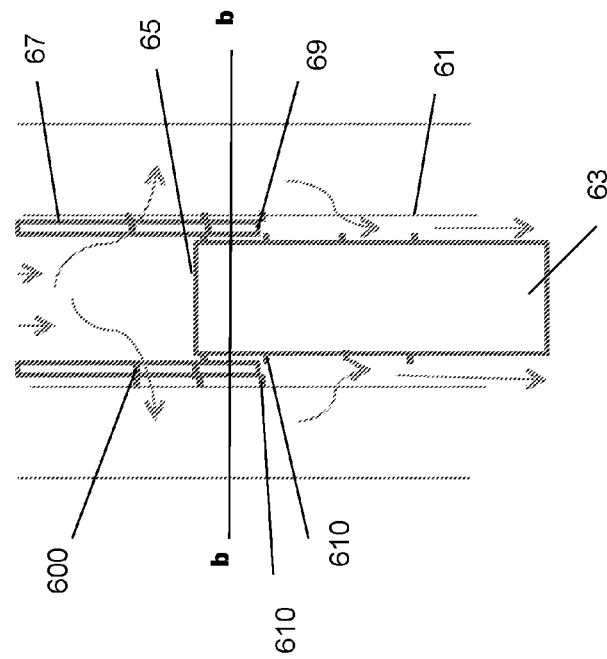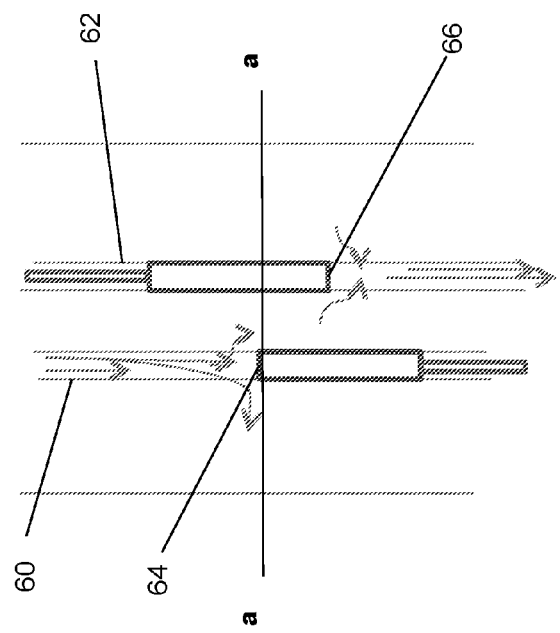

LAYERED THERMAL STORE WITH SELECTIVELY ALTERABLE GAS FLOW PATH

RELATED APPLICATION DATA

This U.S. national phase application is based on international application no. PCT/GB2011/051595, filed on Aug. 24, 2011, which claimed priority to British national patent application no. 1104867.5, filed on Mar. 23, 2011. Priority benefit of these earlier filed applications is hereby claimed.

FIELD

The present invention relates to apparatus for storing thermal energy, and a method of operating the same. The apparatus may form part of apparatus for receiving and returning energy in the form of electricity (hereinafter referred to as "electricity storage" apparatus).

BACKGROUND OF THE DISCLOSURE

A number of systems have been proposed for electricity storage that store the heat of compression of air and absorb the work of expansion of air.

A commonly proposed example of this is called Adiabatic CAES where a salt cavern is typically used as a compressed air store. When electricity is to be stored a motor drives a compressor to compress air into the cavern. The compression process raises the temperature of the air and to allow efficient energy recovery it is necessary to store this 'heat of compression' in some form of thermal store.

The cavern will normally be kept at a minimum pressure, such as 40 bar, and this is increased to a higher limit, for example 60 bar, during charging. These pressures are likely to generate a peak temperature, using air, in the region of 650 degrees C. This is normally either transferred to an unpressured thermal store by a heat exchanger or stored directly in a thermal storage matrix contained within a pressurised vessel. To recover the electricity the process is reversed and the compressed gas is reheated by the thermal store prior to expansion. The work of expansion is used to drive a generator to generate electricity.

The aim is to store the heat with only a small difference between the compressed air temperature and the storage material temperature, such that when the process is reversed the air is heated to near its original temperature.

As mentioned, one option is to use a heat exchanger rather than a thermal storage matrix within a pressurised vessel. However, this sort of heat exchange is extremely difficult to achieve because there are no heat transfer liquids that operate in the range 0-650 degrees C. This means that either multiple liquids must be used or the heat exchange is via a gas, which means a gas to gas heat exchanger.

Multiple heat transfer liquids are difficult to manage, require multiple storage vessels and are generally expensive, but they can operate efficiently and avoid the cost of heavily pressurised vessels.

With gas to gas heat exchangers the temperature range requires the use of quality steels and the gas flows require very large heat exchangers to avoid pressure drop. The result of this is that these heat exchangers are normally both very expensive and not very efficient, with a large temperature difference, such as 50 degrees C., after each heat transfer process.

The most efficient solution is to use a thermal storage matrix, such as a particulate structure, contained within an insulated pressure vessel and to transfer the heat to and from the gas in a manner that is similar to a very large regenerator. This has the best heat transfer, but the storage mass must all be contained within the pressure vessel, which is very expensive.

Heat transfer within a packed bed or porous media is normally a function of surface area. The higher the surface area the better the heat exchange. If smaller particles or channels or pores are used then the surface area tends to increase per unit volume of storage material—it is said to have a higher 'specific surface'. For example:

Packed bed spheres 10 mm diameter (cubic packing) approx 314 $m^2/m^3$

Packed bed spheres 1 mm diameter (cubic packing) approx 3140 $m^2/m^3$

Porous metal foam 5 pores per inch (12% density) approx 430 $m^2/m^3$

Porous metal foam 40 pores per inch (12% density) approx 2100 $m^2/m^3$

This shows that packed spheres with 1 mm particle size have a specific surface of approximately 3140 $m^2$ or surface area in each cubic meter. For the porous foam metal with 40 pores per inch there is a specific surface of 2100 $m^2$ of surface area in each cubic meter. The density of the foam metal is 12% of the solid, which means that it has a void fraction of 88%. The void fraction of the spheres in this example is approximately only 50% by way of comparison.

There is a further advantage of a higher specific surface. Without a temperature difference between two objects there can be no heat exchange. This temperature difference must lead to irreversible thermal mixing which has no impact on the total quantity of heat stored, but does reduce the temperature at which it is stored. This in turn reduces the amount of energy that can be recovered from the stored heat as the quality of the heat has been degraded. This degradation should be distinguished from a simple loss of heat to the environment through the insulated walls of the store.

This degradation is created because there must be a temperature difference between the gas and the particle in the store, so the particles are always slightly cooler than the gas when being charged (in a hot store). When the system is discharged and the gas is blown back in the reverse direction the gas must now be cooler than the particle and hence the gas comes back out of the thermal store at a lower temperature, if it is a hot storage vessel and at a higher temperature if it is a cold storage vessel. This degradation can be regarded as the result of certain irreversible processes and these have a loss associated with them, which in an energy storage scheme results in a reduction of the amount of electricity recovered. These 'irreversible' thermal losses can be reduced by reducing the particle size, but this increases gas pressure losses through the stores.

In a heat storage situation, a 'thermal front' is created in the storage vessel, i.e. a rise or a fall in temperature in the storage media and/or the gas with distance moved downstream, which occurs in the region of the store where thermal transfer is most active. FIG. 10 illustrates the formation of a thermal front in a thermal store and shows how the process of charging a thermal store sets up a thermal front within a region of the store that progresses downstream and that is usually initially quite steep but which becomes progressively shallower as charging continues. Thus, the front starts with length $L_1$, but as it moves down the vessel it extends in length to length $L_2$ and then $L_3$. As the front will usually be asymptotic, the length of the front can be discussed in terms of the length of the front between $T_{H2}$ and $T_{A2}$, these being within 3% of the peak temperature and start temperature. If different criteria are set i.e. within 2% of the peak and start temperatures, then the nominated front lengths will be slightly longer.

For a certain store geometry a longer front will give lower thermal losses, but the length of the front will also reduce the useable amount of the store i.e. it will reduce the store utilization. If a store is 5 m in diameter and 10 m long and the thermal front is 5 m of this length, then the store utilization is reduced to approximately 50%.

If the same sized store was used and the particle size was reduced, then the same level of thermal losses could be achieved with a much shorter front. So a smaller particle size in a packed bed or pore size in a porous media will tend to give better heat transfer, lower thermal losses and better store utilization (a shorter thermal front). The one disadvantage is that there is a pressure drop associated with the fluid flow through the bed and this pressure drop increases significantly as the particle or pore size reduces.

The resistance to fluid flow increases with a decrease in the particle size and gives rise to a pressure drop in the fluid (dP). Pressure is not a vector quantity, but a pressure gradient may be defined with respect to distance. In the case of a thermal store there is a certain pressure drop dP over a store of length L, which in this case means the pressure gradient is dP/L. The pressure decreases in the direction of the fluid velocity so the gas pressure will be lower after the gas has passed through the store. This pressure drop is also the reason why the particle size in packed beds is not reduced to a very small size that will give much higher thermal reversibility. The losses from the pressure drop outweigh the benefits of the smaller particle size.

Accordingly, the present applicant has appreciated the need for an improved thermal storage system which overcomes, or at least alleviates, some of the problems associated with the prior art.

SUMMARY OF THE DISCLOSURE

The present invention provides a heat (or thermal energy) storage apparatus comprising at least one thermal store comprising a chamber having a gas inlet, a gas outlet, and a gas-permeable thermal storage media disposed therebetween, the apparatus being configured such that, during operation, the flow path of a gas flowing through the chamber from inlet to outlet for transfer of thermal energy to or from the storage media can be selectively altered in response to the progress of the thermal transfer.

As the gas flows through the storage media in order for thermal transfer to occur, there is a pressure drop associated with this constrained flow. In very large thermal stores, this can be a considerable pressure drop. By controlling the gas flow path as thermal transfer proceeds, for example, by minimising gas flow through inactive regions of the storage media e.g. upstream regions where thermal transfer is substantially complete, and/or downstream regions where minimal thermal transfer is occurring, it is possible to minimise this pressure drop. The gas flow path may be arranged to bypass such inactive regions, for example, by means of alternative routes through the storage media, by reconfiguring the storage media or by provision of main flow passageways alongside the storage media.

The gas flow path may be selectively altered depending upon the progression of a thermal front moving through the chamber. As indicated above, by "thermal front" is meant the change in temperature, either a rise or fall in temperature in the storage media and/or the gas, which appears in a region of the store where thermal transfer is most active. The media/gas upstream of the position of the front is roughly at a similar temperature to the gas entering the store (i.e. where thermal transfer usually is more or less complete—when charging a hot thermal store the storage media would be at a temperature approaching that of the gas entering the thermal store) and the media/gas downstream of the position of the front is at a similar temperature to the storage media prior to the start of the process (i.e. where thermal transfer is more or less uninitiated—when charging a hot thermal store the gas would be approaching the temperature of the media prior to the start of charging). The gas flow path may be altered so that it only passes through a localised region of the storage media in which the thermal front is located (i.e. an active heat transfer region of the media). Thus, as the thermal front progresses along the length of the storage system, gas flow may, in turn, be confined to different respective active regions of the storage media.

Any alteration in flow path will usually alter the distribution of gas between respective upstream and downstream sections of the storage media, but will not usually alter the gas flow distribution between different parts of a cross-sectional region located at a particular point downstream of the inlet, i.e. in that region gas will be roughly evenly distributed (excepting minor anomalies). The flow path may be gradually altered or altered stepwise. The gas flow path may be altered at least once, at least twice but usually three or more times during a charging cycle, or a discharge cycle. The gas flow path may be diverted to flow through respective downstream regions, in turn, of the storage media, which may be overlapping regions or different adjacent regions.

The flow path may be altered in a variety of ways, depending in part on the nature and arrangement of the storage media and the operating temperatures and pressures of the chamber.

The gas-permeable storage media may be uniform in structure and it may be monolithic. A plurality of suitable flow controllers may be provided at selected intervals downstream in the chamber that allow selected downstream regions to be isolated from or exposed to the gas flow path; flow controlling mechanisms such as, for example, valves, ports, rotating or sliding barriers, baffle systems, or even mechanisms for moving sections of the storage media itself (and/or its supporting structure, if present) may be used. The flow controllers may be configured to act automatically e.g. in response to detected temperature changes from inbuilt sensors, or be controlled by a control system that selectively alters the gas flow path during operation, for example, dependent upon the location of the thermal front. The control system may include sensor or other feedback systems that provide information to the control system as to the extent of progression of the thermal transfer within the storage media; these may be provided inside/outside the thermal store along its length to monitor the position of the thermal front inside the chamber and/or at the exit to measure the exiting gas temperature.

In a preferred "layered thermal store", the storage media is divided into separate respective downstream sections along the chamber; these may be abutting or spaced from one another and may extend across the whole width of the chamber as layers. Flow controllers may be provided and arranged so that gas flow can be permitted through an individual section or through a set of two or three adjacent sections, with flow being switched from one section to an adjacent section (or from one set of sections to a different set involving some new sections) so as to follow the progress of the thermal front. Where the sections are spaced from one another, that space can act as a supply plenum allowing gas from the inlet to be supplied over the whole cross-section of the thermal store (to allow an even flow of gas through the storage media and minimise or remove hot or cold spots). Furthermore, supply ducts or channels in fluid communication with the supply plenum may be provided as a supply network to ensure an even delivery of gas to the storage media and preferably with minimal constriction of the cross-sectional flow area as the gas passes from the plenum to the supply ducts or channels.

The storage media may comprise any material suitable for thermal exchange at the temperatures and pressures contemplated in the thermal store. The media may be a monolithic porous structure provided with an interconnecting internal network of passageways/pores, or it may be a packed bed of particulate material, including fibres, particles or other usually solid material packed so that it is gas permeable. In the case of particulate material, the smaller and more densely packed the material, the greater the potential for pressure drops, and hence, the more desirable the use of flow regulation. Particle sizes of 20 mm or less, or 10 mm or less, or even 7 mm or less may be used in such layered stores.

In one embodiment, the chamber is provided with at least one main flow passageway extending alongside the storage media and with one or more flow controllers capable of selectively altering the gas flow path within the main flow passageway so as to alter the flow path in the storage media. Gas will follow a downstream flow path along the main flow passageway in preference to entering the adjacent storage media, which has a higher resistance to flow than the passageway, unless the passageway is obstructed by the action/inaction of the flow controllers, causing its path to be diverted into the storage media.

Access to the storage media from the passageway may be provided in a number of ways. The passageway may comprise a walled passageway and may have uniformly permeable walls or permeable (e.g. perforated) sections provided at spaced (e.g. regular or irregular) intervals downstream. Alternatively, the passageway may be impermeable but provided with openings or gaps, ports or passageways provided at intervals along its walls. In the case of particulate storage media held within a supporting structure, the passageway preferably also acts as a support column for the supporting structure, especially where a modular system is utilised. However, the passageway may instead be defined by surrounding structures, for example, the storage media (e.g. if monolithic) or structures supporting the storage media (e.g. if particulate, fibrous, etc.). The main flow passageway may extend the whole length of the chamber (for example, it may lead directly from the inlet to the outlet), or merely along part of the length, such as where it is merely providing a bypass function. Usually not more than six, more usually not more than two or three similar such main flow passageways exist along any one particular downstream length of the chamber. The passageway may be partially or fully surrounded by storage media, although preferably, there is a single main flow passageway centrally located within the chamber.

The at least one main flow passageway may comprise an annular or tubular passageway extending lengthwise along the chamber alongside the storage media. An annular passageway may have the storage media located alongside its inner and/or outer walls, for example, being located (e.g. centrally) within and surrounded by the storage media, or it may itself surround the storage media and be located at the chamber periphery.

In one embodiment, a single main flow passageway is provided connecting the gas inlet (directly or indirectly) to the gas outlet and comprising a central, usually cylindrical, passageway extending lengthwise along the chamber through the storage media.

In one embodiment, the apparatus is configured, during operation, to divert the gas flow path from the gas flow passageway to respective downstream regions, in turn, of the storage media; these may be overlapping regions or different adjacent regions. The thermal storage media may be a continuous structure, for example, a monolithic storage media, such as for example, an open celled metal foam structure. Operation (including relative movement) of the flow controllers may allow the flow path to divert to the different regions.

In a preferred "layered thermal store" arrangement, the storage media and/or its supporting structure is divided into discrete sections or layers capable of being selectively exposed to or isolated from the gas flow path by the flow controllers, and disposed at respective downstream positions along the main flow passageway.

In one embodiment, minor flow passageways extend laterally away from the main flow passageway at a plurality of respective downstream positions along its length, permitting lateral gas flow through the storage media. The laterally extending minor flow passageways may be located between the respective sections and/or arranged so that they deliver gas from openings in the passageways to between the sections (e.g. directly into a plenum).

In one embodiment, plenums are provided extending laterally away from the main flow passageway at a plurality of respective downstream positions along its length, permitting lateral gas flow through the sections where the storage media is located. Plenums may comprise gaps that are normally just upstream or downstream of the storage media (or its support structure), and the storage media (or its support structure) may be provided in sections, for example, it may be modular. Plenums or minor passageways facilitate even gas distribution across the whole cross section of the storage media thereby allowing the gas to flow evenly through the storage media and hence, minimising or avoiding hot or cold spots.

In one embodiment, the main flow passageway is obstructed by a flow controller comprising at least one baffle system adapted to move along and block the passageway so as to divert a gas flow path into or out of the storage media. The baffle may partially or fully obstruct the passageway and may comprise a cylindrical body where the passageway is cylindrical, or an annular body, where the passageway is annular.

In one embodiment, a baffle system is adapted to block the passageway so as to divert a gas flow path into the storage media at an upstream face of the baffle system. In this way, gas flow may be allowed to bypass inactive regions of the media upstream of the thermal front where thermal transfer is already substantially complete, and hence, only enter the storage media when necessary. The position of the upstream face should be a short distance upstream of the location of the thermal front (i.e. in the solid thermal media).

In one embodiment, a baffle system is adapted to block the passageway so as to permit a gas flow path to emerge from the storage media at a downstream face of the baffle. In this way, gas flow may be allowed to bypass inactive regions of the media downstream of the thermal front where thermal transfer would be minimal. The position of the downstream face should be a short distance downstream of the location of the thermal front (i.e. in the solid thermal media).

The baffle may be adapted to block the passageway and be movable along the passageway with the thermal front so as only to permit fluid flow in the active section(s) of the store.

Preferably, the positions of the respective upstream and downstream faces are independently adjustable so that the length of the thermal front can be allowed to vary. For an energy storage system this is preferable because it can improve the efficiency of the system. For example if a thermal store is partially charged and left in this state over a period of time there is a tendency for the thermal front to lengthen due to heat transfer within the store. In this case at discharge there may be a benefit in changing the position of the baffles faces to allow for this lengthened thermal front.

The baffle system may be provided in the same main flow passageway. The baffle system may comprise respective upstream and downstream faces, and be arranged such that the gas flow diverted by the upstream face into the storage media is not permitted to return to the main flow passageway until it reaches the downstream face. The separation of the respective upstream and downstream faces is preferably capable of being adjusted such that a variable length of the main passageway is blocked from use and this may be accomplished using a telescopic body. The upstream and/or downstream faces may be contoured so as to direct gas flow without undue turbulence.

Alternatively, separate baffle systems may be provided in separate respective main flow passageways so as to block them such that the gas flow path diverts into, the storage media at the upstream face of one baffle system in one main flow passageway and emerges from the storage media at the downstream face of the other baffle system in the other main flow passageway. While this arrangement requires more of the chamber volume to be used as passageway, the use of separate baffle mechanisms to independently control the respective upstream and downstream faces can be simpler to operate and more robust, especially where high operating temperatures are employed.

In the case of the above-mentioned "layered thermal store", where separate sections or layers are disposed at respective downstream positions along one or more main flow passageways, a baffle system or systems may be used to block gas flow from accessing one section or a plurality of adjacent sections. The baffle may be extendable, for example, telescopically, so as to vary the number of sections of storage media that it blocks.

In such a layered store, plenums may exist between the respective layers and/or minor flow passageways may be provided within or between respective layers such that gas entering the gas inlet can move down a main flow passageway, as the path of least resistance, until it reaches the baffle system, whereupon it is diverted into a plenum or minor flow passageway and forced to pass through one or more sections of the storage media before re-entering the passageway via the first unblocked plenum or minor flow passageway it encounters. In the case of a layered upright store with such a baffle and a single central passageway, this may comprise a central cylindrical supporting column. This may be provided with access ports along its length communicating with respective plenums between the layers. The supporting column may support shelving for the respective layers of storage media, and may be built in a modular fashion. Supporting arms may extend radially outwards from the supporting column in each layer providing rigidity and a supply network of minor flow passageways. Arms in respective layers may be aligned with one another, for example, they may be provided/supported by common walls extending the length of the store for additional strength.

The heat storage apparatus may further comprise a control system for selectively altering the gas flow path. This may include sensors at the inlets and/or outlets and/or sensors arranged along the length of the chamber. However, active control by a control system may not be necessary, for example, where the manner of operation is well understood and/or predictable.

The heat storage apparatus may further comprise at least one ancillary thermal store arranged in series with the at least one thermal store and comprising a chamber containing a gas-permeable thermal storage media and adapted for transfer and confinement of a thermal front therein. The ancillary store preferably has the same internal chamber width as the main store, but is shorter (usually less than one third its length) and has increased insulation. The use of an ancillary store is preferable to allowing the front to remain in the main store (during a break in operation), where the temperature difference would otherwise eventually dissipate in an uncontrolled manner. There may be two said ancillary thermal stores respectively arranged in series upstream and downstream of the at least one thermal store, where "parking" of a thermal front after both a charging cycle and a discharging cycle may be required.

The thermal store(s) will usually be an upright vessel arranged for vertical gas flow therethrough so that the thermal front progresses upwards or downwards through the store(s), and is not affected by convection (i.e. so that the hottest gas flow always enters or leaves from the top of the store).

The heat storage apparatus may comprise an upright chamber with one or more substantially vertical main flow passageways extending lengthwise along the chamber, the apparatus being arranged such that the gas inlet is provided at the top of the chamber where it is set up as a hot inlet, or, at the bottom of the chamber where it is set up as a cold inlet. Usually, the thermal storage media is arranged in respective substantially horizontal thermal storage layers capable of being selectively exposed to or isolated from the gas flow path. One or more substantially horizontal insulating layers may be optionally interposed between said thermal storage layers, or replace said layers.

The heat storage apparatus may form part of an electricity storage system, in particular, a pumped heat electricity storage system or compressed air energy storage system.

There is further provided a method of operating heat storage apparatus comprising at least one thermal store comprising a chamber having a gas inlet, a gas outlet and a gas-permeable thermal storage media disposed therebetween, wherein gas is caused to flow through the chamber from the inlet to the outlet for transfer of thermal energy to or from the storage media, and the flow path of the gas is selectively altered dependent upon the location of a thermal front that is moving through the storage media.

During operation, the flow path may be altered to bypass regions of the storage media upstream of the thermal front, in which regions thermal transfer is substantially complete.

During operation, the flow path may be altered to bypass regions of the storage media downstream of the thermal front, in which regions thermal transfer is minimal. Where both of these occur, the flow path may therefore be altered such that it only passes through a region of the storage media localised around the thermal front. The two respective path alterations are preferably carried out independently of one another.

The method may involve diverting the gas flow path to respective downstream regions, in turn, of the storage media; these may be overlapping regions or different adjacent regions. The gas flow may be selectively directed from a first region to a second region downstream of the first region and the gas flow may pass, in turn, down the length of the store through respective such regions.

BRIEF DESCRIPTION OF THE DRAWINGS

A number of embodiments of the present invention will now be described, by way of example only, with reference to the accompanying drawings, in which:

FIGS. 2a to 2d are respective views of modular components of the thermal store of FIG. 1;

FIGS. 6a, 6c and FIGS. 6b, 6d are respective sectional views of two alternative baffle systems.

DETAILED DESCRIPTION

Figure 1:
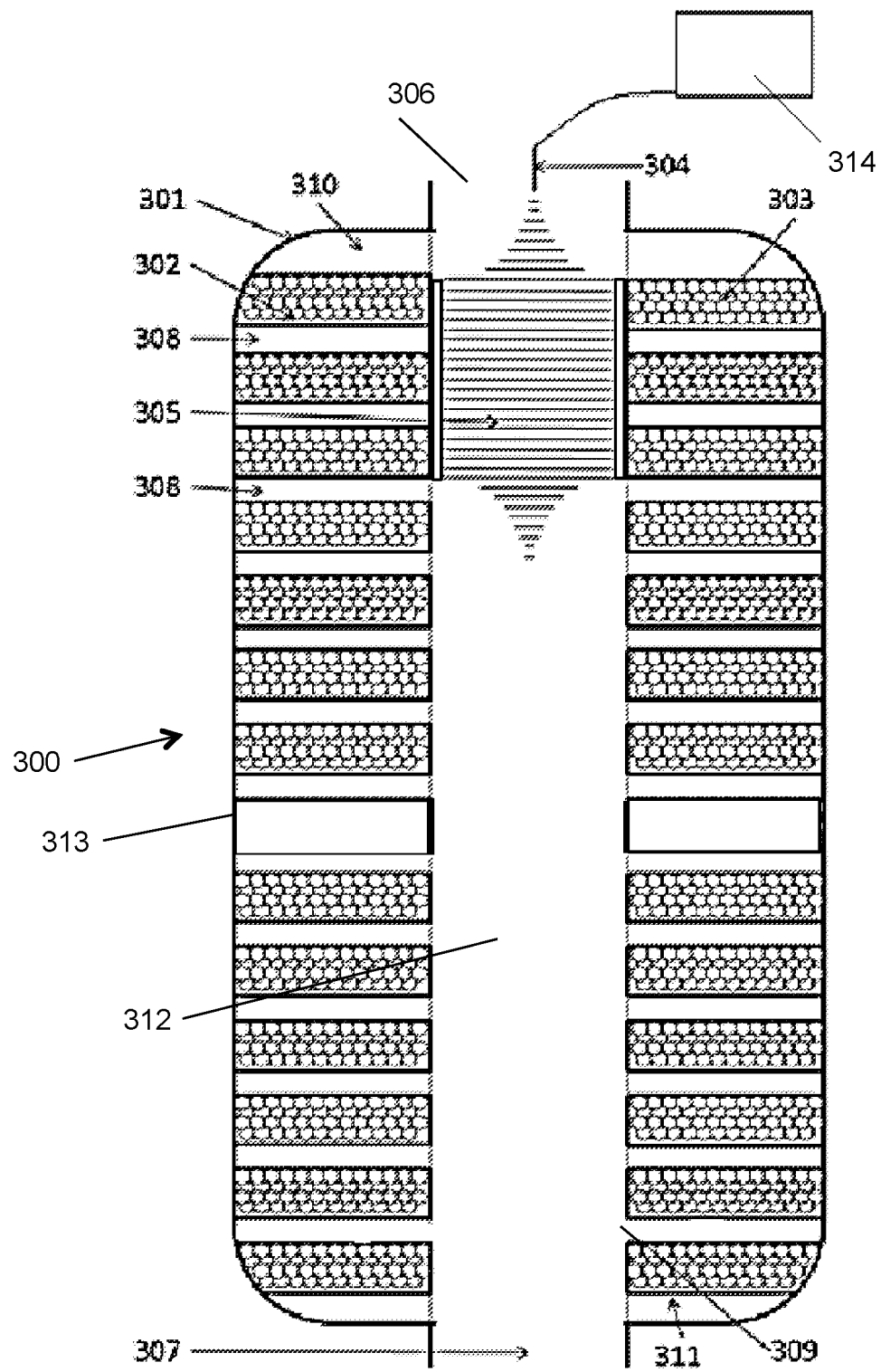
FIG. 1 is a schematic sectional view of a thermal store comprising an embodiment according to the present invention.

FIG. 1 is a schematic sectional view of a thermal store 300 according to the present invention. The store 300 comprises a thermally insulated upright chamber or pressure vessel 301 and thermal media 303 arranged in layers on a thermal media support structure 302. The thermal media 303 is in the form of a porous or particulate solid, such as for example, gravel. Gas inlet/outlets 306 and 307 are provided at each end of the chamber and communicate directly with a central cylindrical main flow passageway 312 formed by a cylinder 309 which extends vertically through the chamber alongside the storage media 303 through the respective layers.

Figure 3:
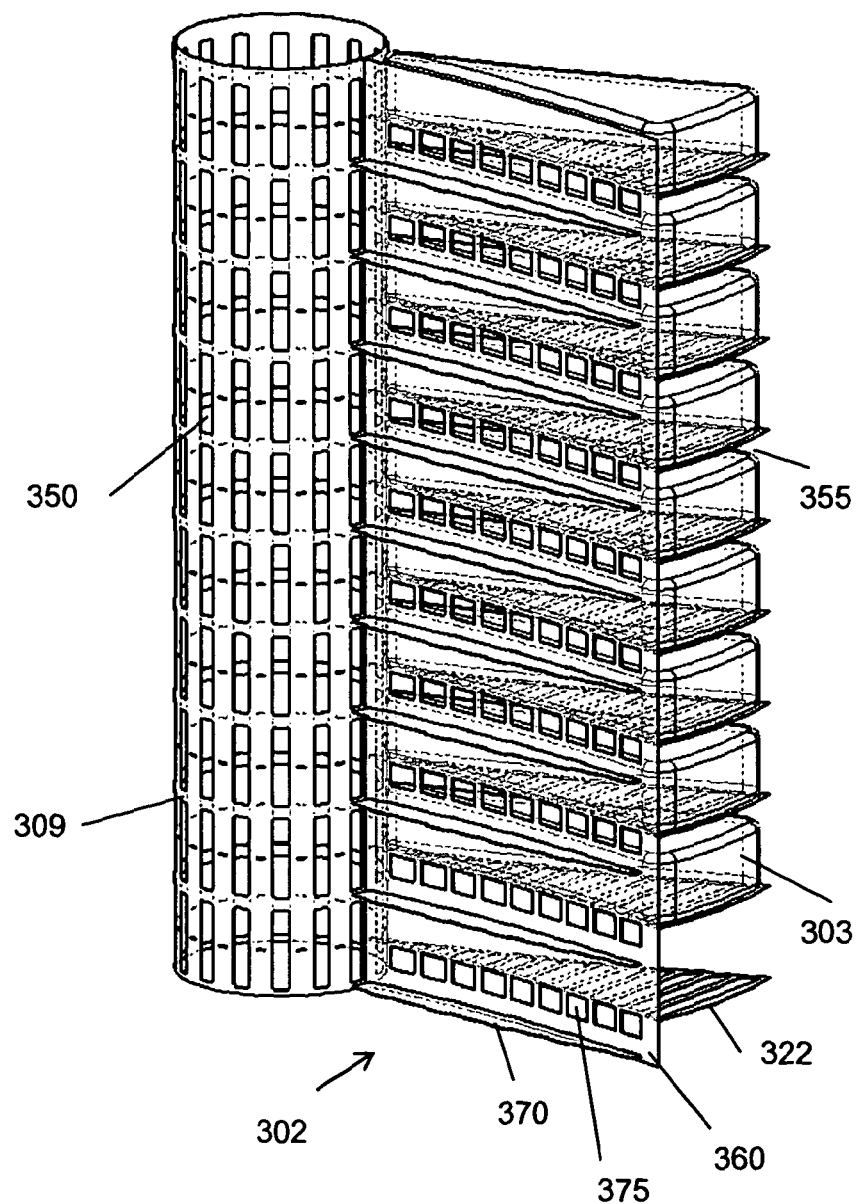
FIG. 3 shows the modular component of FIG. 2c in greater detail.

Referring to FIGS. 2 and 3, these show the support structures 302 and supporting cylinder 309 of the layered store 300 in more detail. The system is modular and comprises a cylinder 309 which acts as a support for the remaining support structure 302. The support cylinder 309 has multiple rows of apertures 350, which are arranged at intervals downstream from one another, corresponding to the respective downstream layers; the apertures in each row are aligned with apertures in rows above and below and allow the gas to access the storage media.

Pairs of longitudinal vanes 360 supported by the cylinder 309 extend radially outwards from the cylinder in a "petal" arrangement. These pairs of vanes extend the length of the cylinder 309, as seen in FIG. 3, and define between them a longitudinal space. However, gas flow entering through the cylinder apertures 350 is prevented from passing downstream through that space due to horizontal, radially extending, solid shelves 370 provided at each layer, which divide the space into respective minor flow passageways 365 aligned as a column vertically on top of one another and extending out radially (as the "petals") from the main flow passageway 312 in each of the respective layers, as seen in FIG. 2d.

Each pair of vanes 360 supports a vertical stack of circular-sector shaped support trays 322 which form the respective downstream layers and support and confine the storage media 303. Each vane has horizontal rows of apertures 375 provided at intervals downstream from one another corresponding to the respective minor flow passageways and these allow gas that has entered the minor flow passageways 365 to transfer into the storage media. The aim of the minor flow passageways 365 is to allow an even distribution of gas to pass through the horizontal row of apertures 375 and consequently as the minor flow passageway 365 approaches the chamber wall it may taper in proportion to the reduction in the gas flow.

It will be noted that vane apertures 375 are aligned with a gap 355 that exists between each of the layers and which forms a plenum 308 above each layer of storage media. There is an additional plenum 310 above the top layer and another plenum 311 below the bottom layer. These plenums may be shaped so that they form a parallel sided chamber or they may form a non-parallel or non-uniform chamber, such as a taper, that allows flow to be distributed evenly over the surface of the media 303. The plenum gap 308 may contain just gas or it may contain a highly porous insulating material (not shown) that provides minimal flow resistance to gas, but that does reduce heat transfer between layers and the development of any convective flows. Halfway down the cylinder an optional insulating layer 313 may be provided instead of a layer of support media.

A baffle system or valve 305 is supported by valve control wire/rod 304 within the main flow passageway 312 so as to block it. Valve 305 consists of a cylindrical drum that fits closely within the cylinder 309. Valve 305 may be made of an insulating material or contain an insulating material. The top and bottom surfaces of valve 305 may be shaped to divert the flow to/from the cylinder 309 evenly into the plenum spaces 308. The position of valve 305 along cylinder 309 is altered by valve control wire/rod 304, which is controlled by control system 314.

Referring to FIGS. 4a to 4i, these illustrate the operation of the baffle system or valve 305 of the thermal store of FIG. 1 during charging and discharging.

Figure 4A:
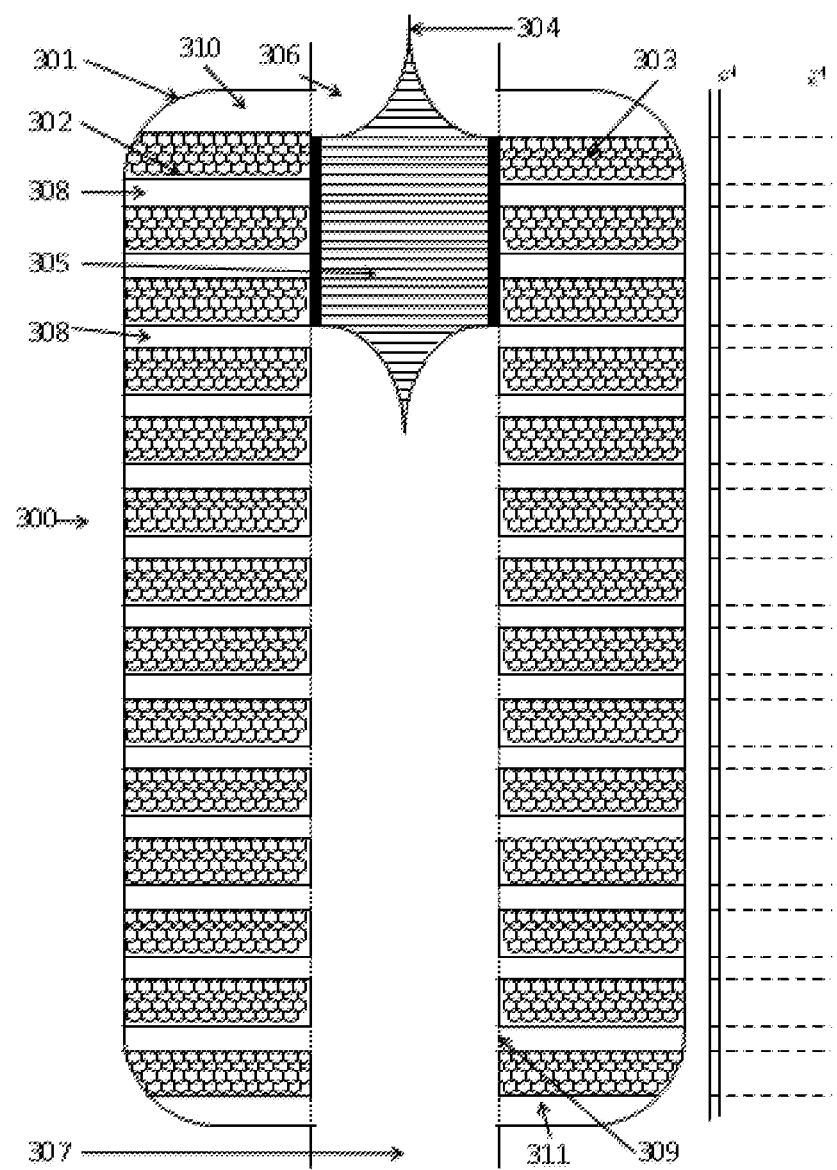
FIGS. 4a to 4i illustrate the operation of the baffle system of the thermal store of FIG. 1 during charging and discharging.

If the thermal store is used to store heat then the temperature in its charged state is higher than that in its discharged state. If the thermal store is used to store 'cold' then the temperature in its charged state is lower than the temperature in its discharged state. In FIG. 4a the improved heat storage system is in a discharged state and by way of example it is at a temperature $T_A$ (ambient temperature). To the right of thermal storage vessel 301 is a graph that shows the temperature of the gas inside the vessel as you progress from the top of the store to the bottom. When there is no flow the gas temperature will approach that of the storage media. For a store that is used to store heat it is preferable to charge it from the top downwards—for 'cold' the reverse applies. There is no gas flow within or through the store in this figure as the system is in a discharged state and it is not being charged.

In a charging mode hot gas enters via inlet/outlet 306 and cooler gas leaves via inlet/outlet 307. When discharging cooler gas enters via inlet/outlet 307 and hotter gas leaves via inlet/outlet 306.

Figure 4B:
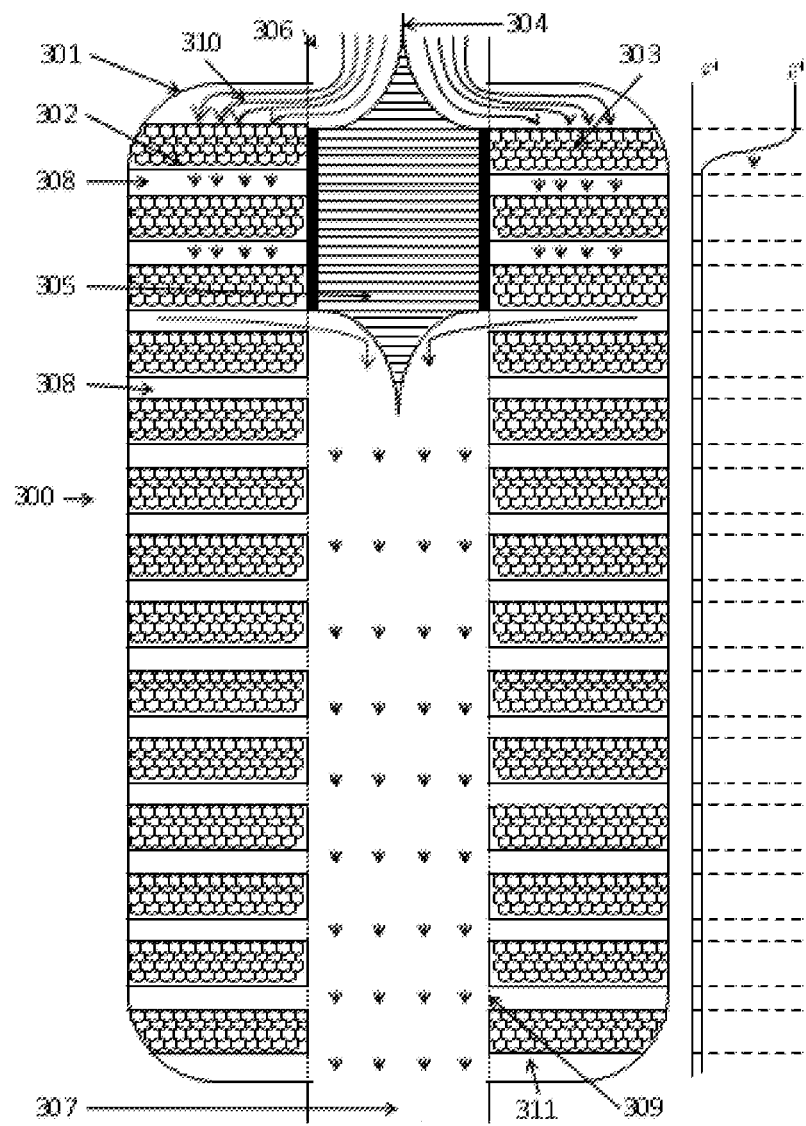
Figure 4C:
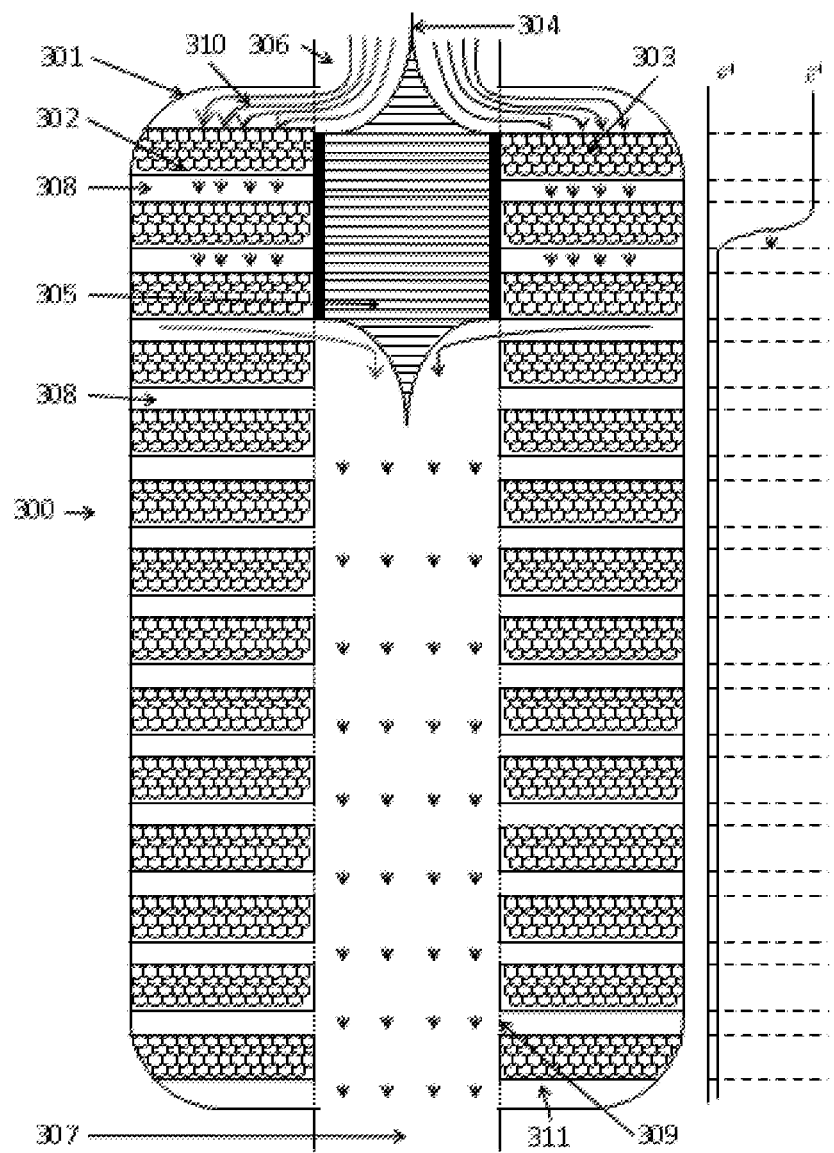
Figure 4D:
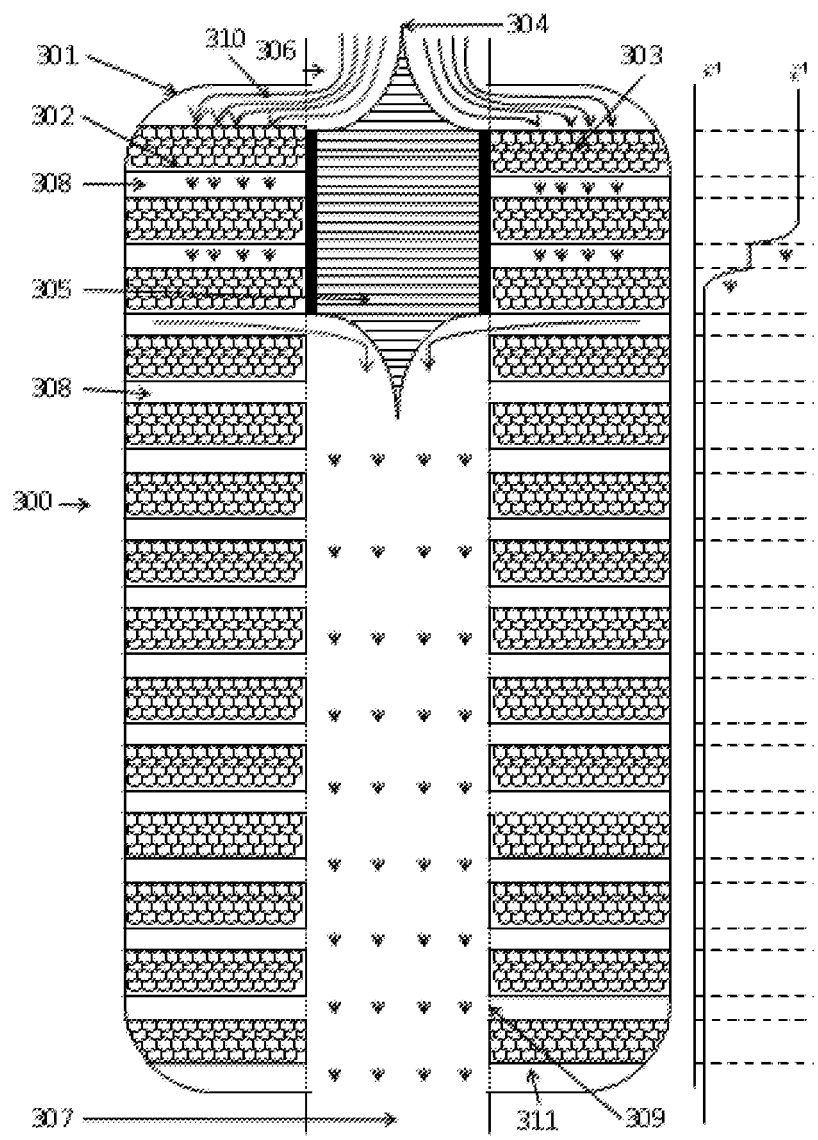

FIG. 4b shows the system starting to be charged. The gas enters the system through the inlet/outlet 306 and meets the valve 305. The valve 305 is blocking the cylinder 309 which offers the path of least resistance to the gas and consequently the flow is diverted into the plenum 310. The gas then passes into and through three of the layers of thermal media before returning to within the cylinder 309 (path of least resistance) and then exiting the store through inlet/outlet 307. As the gas passes through the thermal media it is cooled while it heats the thermal media. This sets up a thermal front within the store where the gas is cooled from $T_H$—the inlet temperature—to very close to $T_A$—the temperature of the store at the start. As more gas passes through the store this thermal front moves down the store. This is shown in FIGS. 4c and 4d.

It should be noted that there are actually two thermal fronts, one in the solid thermal media and one in the gas. This is caused by a difference in temperature between the gas and the solid thermal media 303, which depends upon a number of factors such as flow rate and the size of each element in the thermal media 303. If the thermal media is made of very small particles, such as sand then the temperature difference between the gas and solid is very low. If the thermal media is larger, say gravel, then for the same flow rate the temperature difference will also be greater and there will be a separation between the gas thermal front and the solid thermal front. The solid thermal front will always lag the gas thermal front when charging.

Because of this slight difference in temperature a store or layer will never quite reach the temperature of the gas entering the store. Consequently a decision will be made when it is 'fully charged' that may vary for different stores and operational uses.

There is a pressure drop as the gas passes through the thermal media. This pressure drop can also ensure that an evenly distributed flow enters the thermal media and heat transfer occurs evenly across the thermal media, so as to avoid cold spots. If the pressure drop is too low to allow this to happen then it is possible to design the geometry of the plenum spaces 308, 310, 311 such that they naturally distribute the flow around the spaces.

Figure 4E:
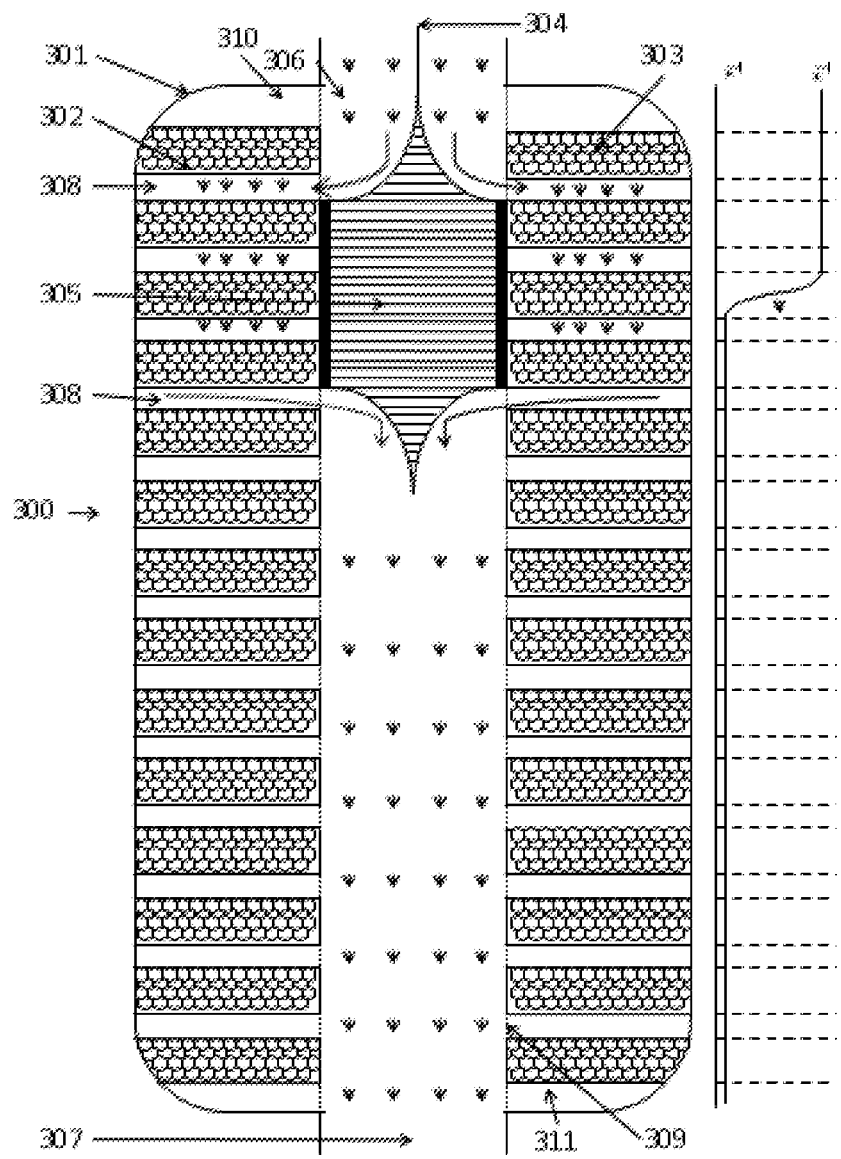
Figure 4F:
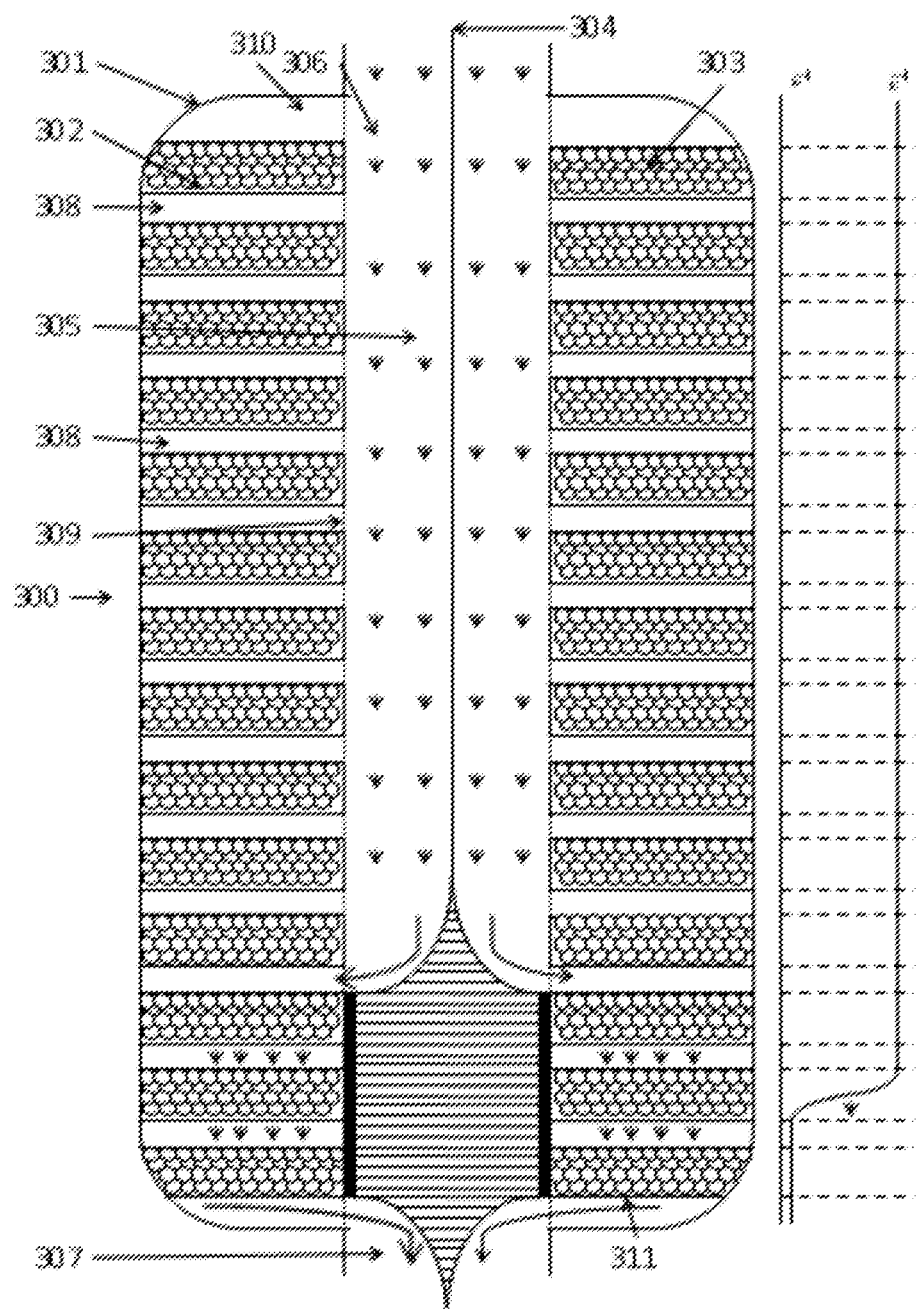
Figure 4G:
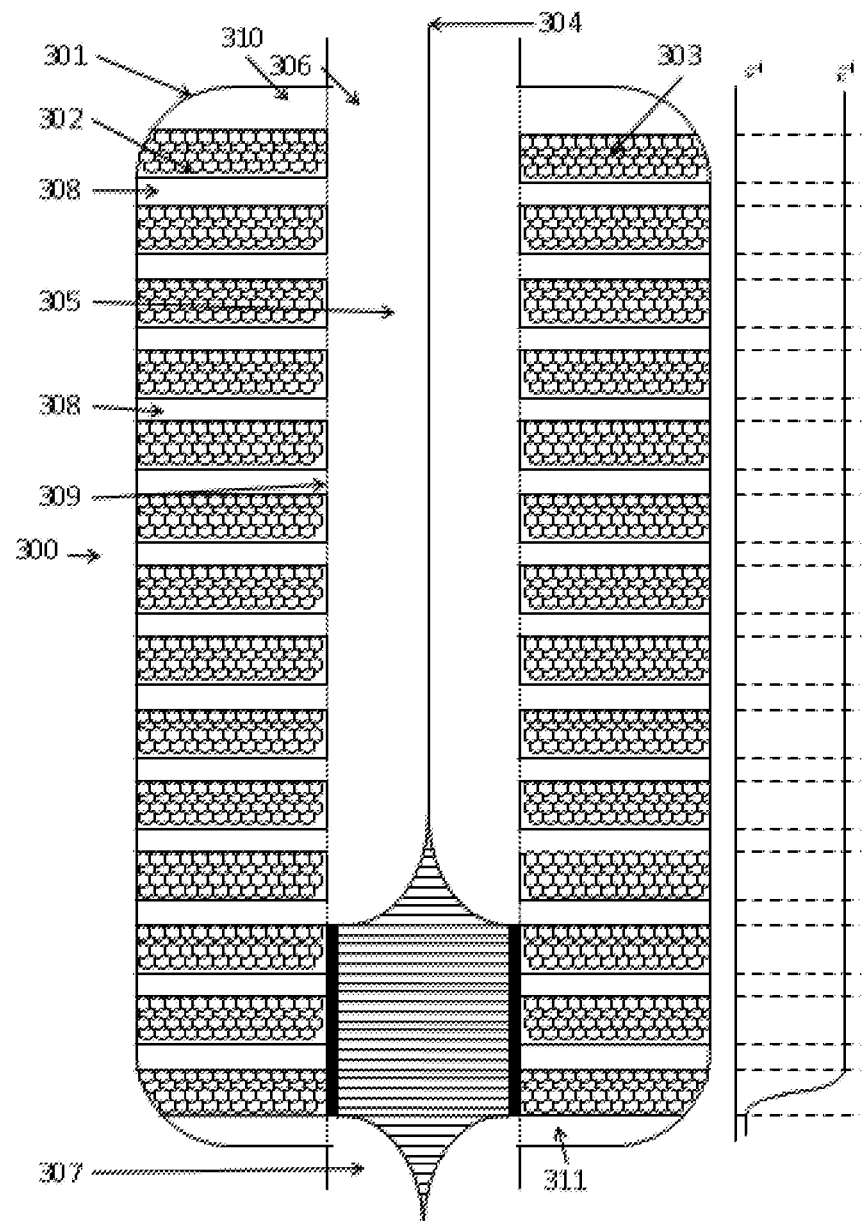

In FIG. 4d it can be seen that the thermal front crosses one of the plenum spaces 308. While crossing the plenum there is no opportunity for the gas to cool so the temperature is generally constant across the plenum. In FIG. 4d the thermal front is starting to approach the end of the third layer and the first layer is suitably charged. At this point, as is shown in FIG. 4e, the valve 305 is lowered by one layer. This has the effect of the making the gas bypass the first layer and also bringing the fourth layer into the gas circuit. This process repeats itself until the valve has reached the last layer as shown in FIG. 4g. At this stage the system is run so that the gas thermal front is just exiting the stores and is left in the last layer or layers.

Figures 7, 8:
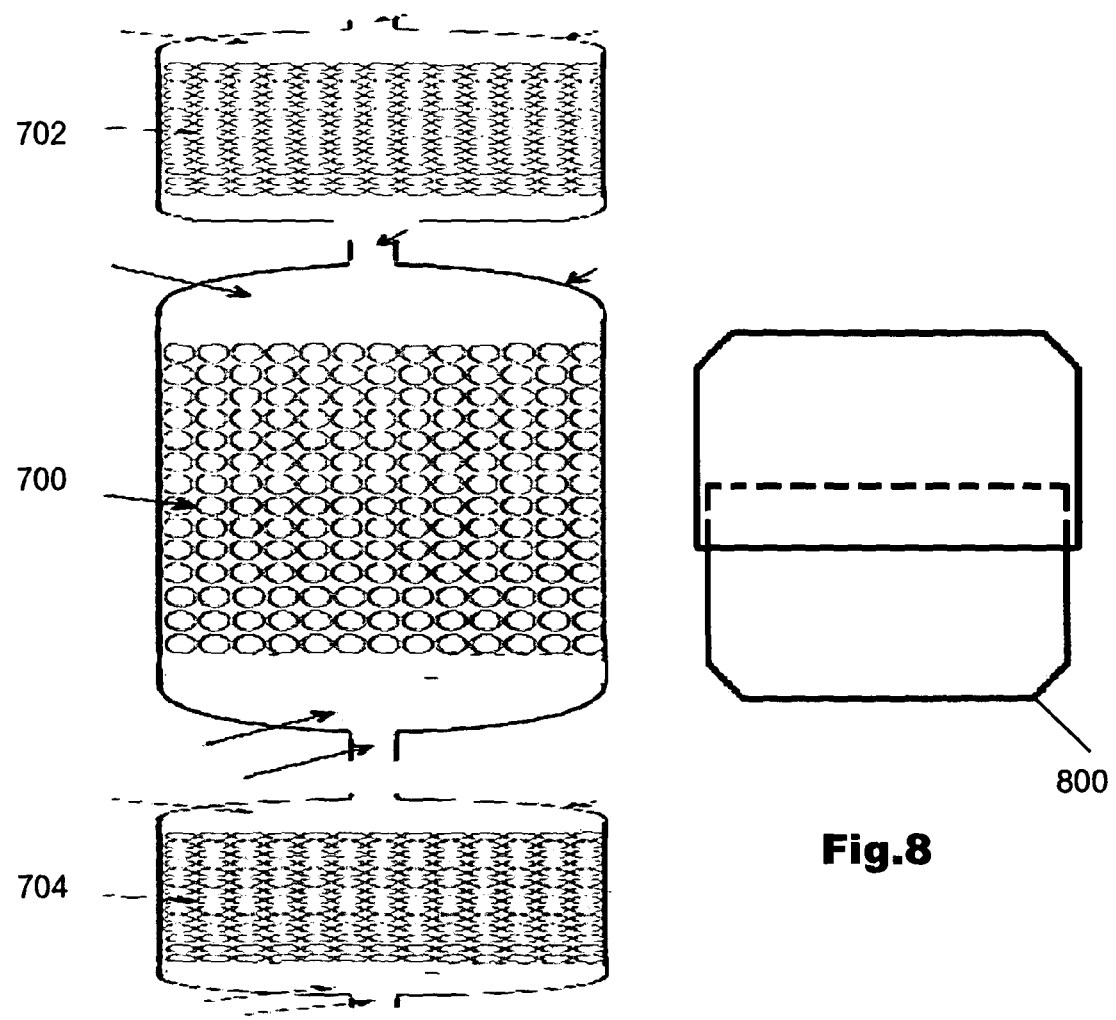
FIG. 7 is a schematic side view of a thermal store with an ancillary store at each end.
FIG. 8 is a schematic view of a telescopic baffle system.

As the front progresses down the store there is a tendency for the thermal front to lengthen. The valve may be a simple valve of fixed length but is preferably designed so that its length can be adjusted commensurate with any change in the length of the thermal front. An example of a telescopic valve 800 is shown in FIG. 8. Control logic for independently operating the upstream and downstream faces of such a valve is discussed below.

Figure 4H:
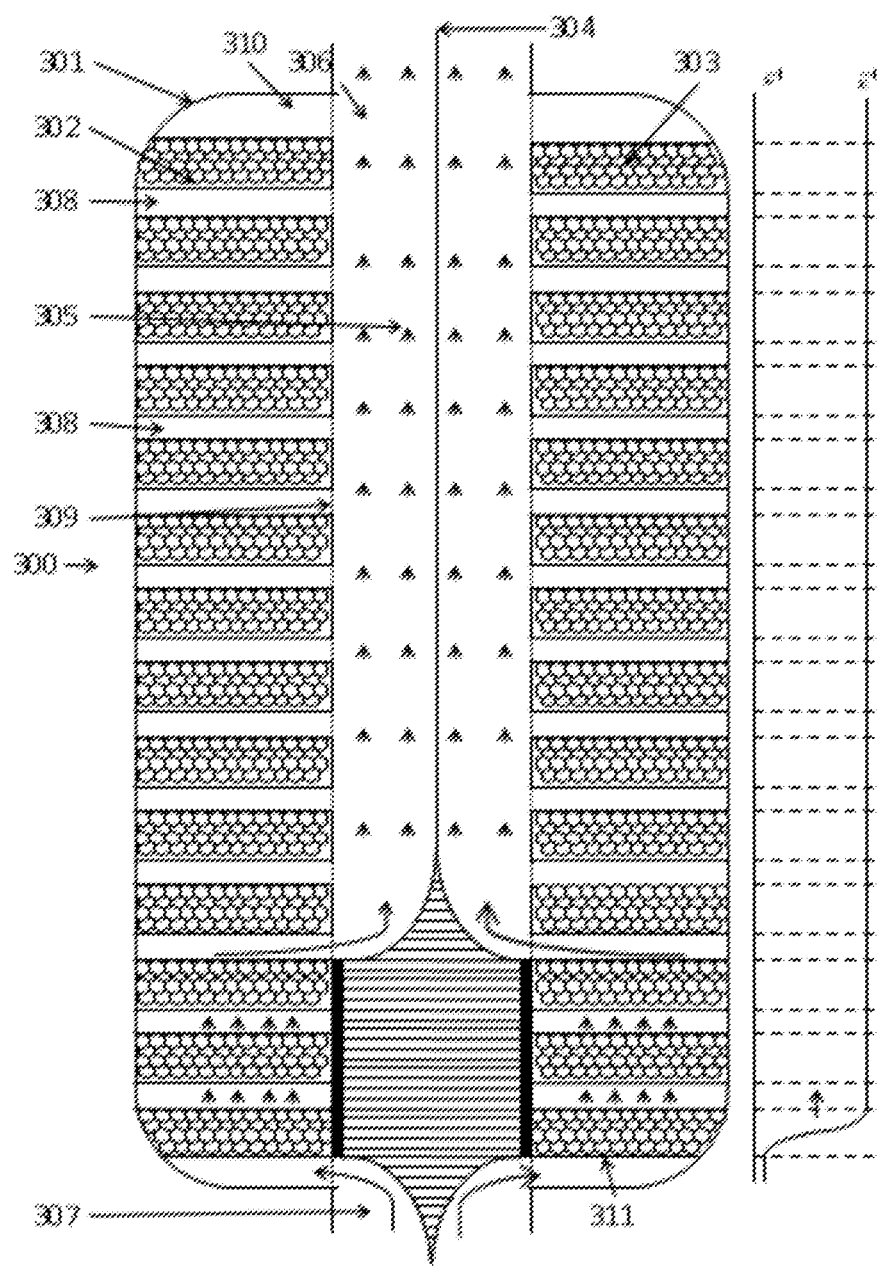
Figure 4I:
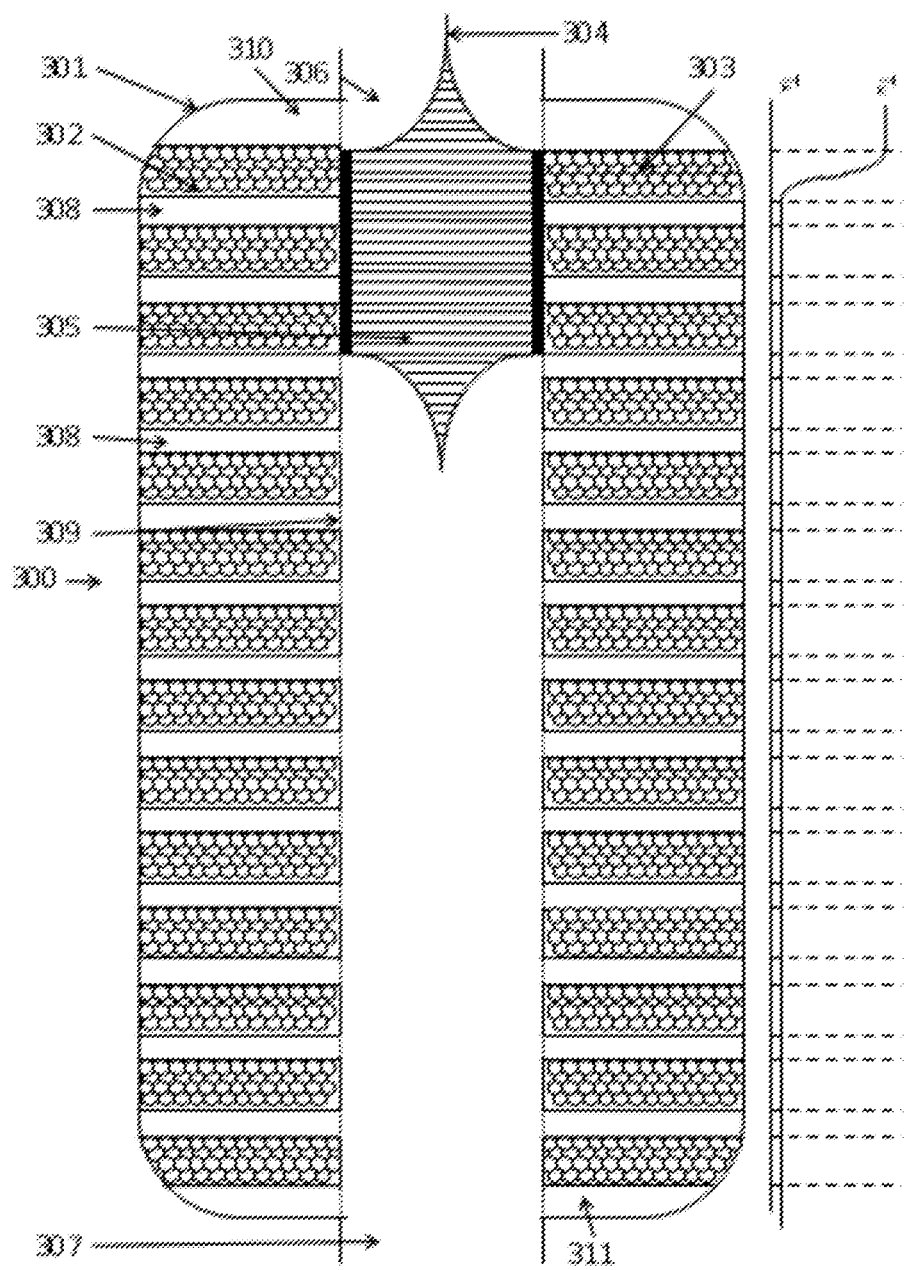

FIG. 4g shows the store in a fully charged state. FIG. 4h shows the store where the gas flow has been reversed and it is now being discharged. FIG. 4i shows the store in a discharged state, but where the front has been left within the store so that it is available for the next charge cycle. If this is now left for a long period of time the thermal front will slowly slacken and extend further into the store. The store can start in either the FIG. 4a state or the FIG. 4i state, or somewhere in between.

When the store is charged or discharged it can be advantageous to preserve the thermal front that has been generated. This can be done by leaving it within the store. This area where the front is 'parked' can be designed to maintain the temperature profile of the thermal front, ie it can be surrounded by an insulating material or else it can be an insulating material (e.g. a layer could be provided at an end of the chamber similar to insulating layer 313). Alternatively, it may be more advantageous to park the front in a separate store that is designed for this purpose.

Referring to FIG. 7, this illustrates how a thermal store 700 could be arranged in series with ancillary stores 702 and 704 provided one at each end of store 700 for "parking" of a thermal front after a complete charging or discharging cycle. (Main flow passageways and flow controllers are not shown.) Generally the thermal store 700 is much larger than ancillary stores 702 and 704. In this scenario the thermal front when discharged will be stored in ancillary store 702 (assuming it is a hot store) and when charged in ancillary store 704. In this way the media within ancillary store 702 will end up as part of the overall storage material when the system is charged. This design is more suitable for thermal stores where they are not charged and discharged on a regular basis.

FIGS. 4a to 4i show the store being fully charged and discharged. However, it is possible to reverse the gas flow at any stage during this process and it is not necessary to run the front to the end of the store before starting discharging.

Returning to the adjustable valve, the advantage of a flexible valve length is that a control logic can be set up that is based upon the gas temperatures between the layers, where the charged layers control the movement of the top part of the baffle (when charging a hot store) and the exit gas temperatures from each layer determine when the lower part of the valve moves to include the next layer. In this way the movement of the top and the bottom of the valve are independent of each other and based upon different criteria.

For example, charging control logic for a single layered store where a baffle system diverts gas flow from a passageway into the media at an upstream face, and the same (or a different) baffle system permits the gas flow path to emerge from the media into the same (or a different) passageway at a downstream face, and where the upstream and downstream faces have independent control, may be carried out as follows:

For Charging a "Hot" Store

1) Where $T_{layer\ U}$ is the gas temperature at the exit of the specific layer that is the most upstream layer of a region where active thermal transfer is occurring, i.e. it is measured after the flow has passed through each layer and the relevant temperature is just after the gas has passed through the first of the layers that it is due to encounter (due to a baffle forcing it into those layers). $T_{inlet}$ is the temperature of the inlet gas to the vessel, and $T_{inlet\ diff}$ is a chosen difference in temperature from the inlet temperature, the upstream face of the baffle system should move down one layer (so that flow starts to bypass that specific layer) when:

$$T_{layer\ U} = T_{inlet} - T_{inlet\ diff}$$

i.e. the layer is approaching the inlet temperature and thermal transfer is nearly complete. For example, when charging a hot store from 50° C. to 500° C., $T_{inlet}$ is 500° C. and $T_{inlet\ diff}$ may be 10° C., so the baffle will move when $T_{layer\ U} = 490°$ C. (i.e. 500° C.−10° C.)

2) Where $T_{layer\ D}$ is the temperature at the exit of the specific layer that is the most downstream layer of a region where active thermal transfer is occurring i.e. it is measured after the flow has passed through each layer and the relevant temperature is just after the gas has passed through the last of the layers it is due to encounter. This temperature is often very similar to that at the outlet from the vessel $T_{outlet}$. $T_{start}$ is the start temperature of the gas (and solid) in the vessel, and $T_{outlet\ diff}$ is a chosen difference in temperature from the start temperature, the downstream face of the baffle system should move down one layer when:

$$T_{layer\ D} = T_{start} + T_{outlet\ diff}$$

i.e. the layer has started to rise noticeably in temperature relative to the start temperature (which is normally the temperature of all the layers below that layer). For example, when charging a hot store from 50° C. to 500° C., $T_{start}$ is 50° C. and $T_{outlet\ diff}$ may be 25° C. (e.g. 75° C.=50° C.+25° C.). To this end, temperature sensors such as thermocouples may be installed at individual levels within the vessel. Inlet and outlet vessel temperatures may be measured as well, as required.

For Discharging a "Hot" Store

3) Conversely, where flow is reversed, the outlet becomes the inlet and cold gas enters the hot store (from the bottom in an upright store) to cool it, the upstream face (now the lower one in an upright store) moves up one layer when the most upstream layer of the active transfer region (i.e. nearest the inlet) has cooled so that the temperature just after the layer is nearly as cool as the (cold) inlet temperature (now present upstream of the active thermal transfer region).

$$T_{layer\ U\ discharging} = T_{inlet} + T_{inlet\ diff}$$

For example, $T_{inlet}$ might be 40° C. and $T_{inlet\ diff}$ might be 10° C., so that $T_{layerU\ discharging}$=50° C. (ie 40° C.+10° C.)
In this way in normal operation $T_{layerU\ discharging}$ ends up approximately at the same temperature as $T_{start}$.

4) The downstream face moves up one layer when the most downstream layer (nearest the outlet) has managed to cool a certain amount from the (hot) start temperature (as still present downstream in the rest of the store and approximately equal to the $T_{layer\ U}$ of charging section 1) above).

$$T_{layer\ D\ discharging} = T_{hotstart} - T_{outlet\ diff} \text{(e.g. 480° C.=490° C.-10° C.)}$$

Figure 5A:
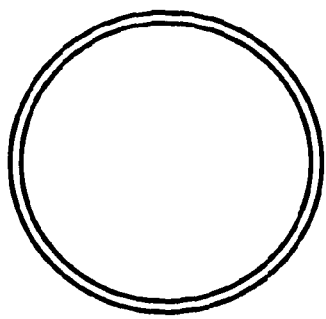
FIGS. 5a to 5c are schematic illustrations of alternative arrangements of main flow passageways in a thermal store.
Figure 5B:
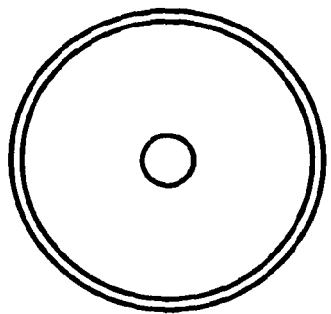
Figure 5C:
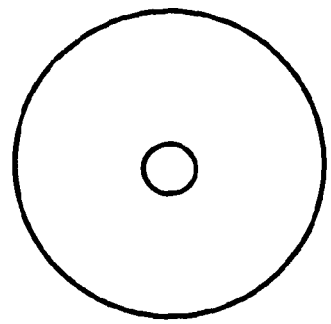

While the above thermal store has a central cylindrical passageway, as shown in FIG. 5c, other types of passageway may also be employed. For example, FIG. 5a shows an annular passageway disposed on the periphery of the storage vessel, while FIG. 5b shows two passageways, namely, a peripheral annular passageway and a central passageway.

As explained above, it is desirable to independently control the respective gas flow path alterations upstream of and downstream of the baffle system. One way of achieving this without using complicated baffle systems that can change their length is to use two separate passageways each containing a baffle system, the respective baffle systems controlling the upstream and downstream alterations respectively. Thus, FIG. 5b could comprise a cylindrical baffle system and annular baffle system working in co-operation.

Referring to FIGS. 6a and 6b these show two further alternative dual baffle arrangements. In FIG. 6a, two centrally arranged tubular passageways 60 and 62 are respectively occupied by opposing pistons with valve faces 64 and 66 which divert the gas flow into the storage media and allow it to return from the media, respectively. Thus, the region of the storage media between faces 64 and 66 is exposed to the gas flow, this being the region of the media in which the thermal front is localised (and the only region which would have had active thermal transfer even if the whole storage media had been exposed to the gas flow).

FIG. 6b shows a dual baffle arrangement but in a single tubular passageway 61. Here, piston 63 has an active valve face 65 that diverts gas flow into the storage media. However, annular baffle structure 67 is provided with annular valve face 69 at which gas flow may re-enter the passageway 61. Annular baffle structure 67 also has gas permeable walls but these are arranged as respective downstream segments that are separated by solid partitions 600. In this arrangement, sealing rings 610 are required in order to prevent gas slipping past the inner or outer annular walls of annular baffle structure 67.

Figure 6E:
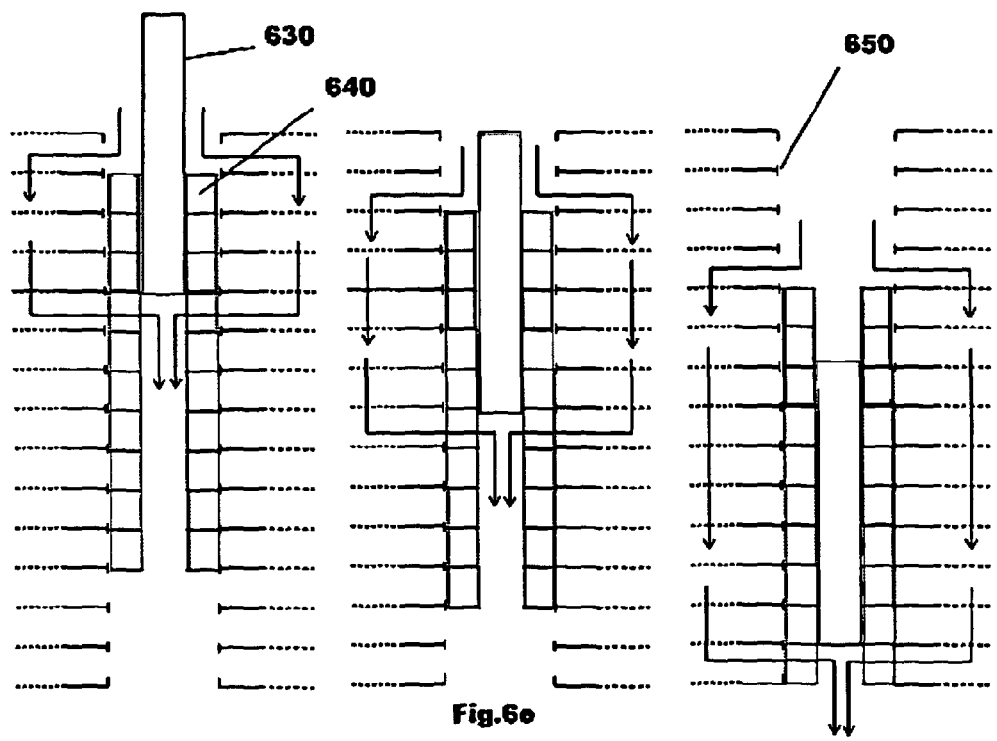
FIG. 6e shows three sectional views of the baffle system of FIGS. 6b, 6d depicting active thermal transfer regions with 3, 5 and 9 active layers, respectively.

FIG. 6e shows three enlarged sectional views of a slightly modified version of the baffle system of FIGS. 6b, 6d depicting active thermal transfer regions with 3, 5 and 9 active layers, respectively, foamed by relative movement downwards of the inner solid cylindrical baffle 630 within outer, annular baffle structure 640. The latter is shown with a partly shaded portion as it is configured (in this example) to indicate that that portion is solid. It is therefore impermeable to gas flow laterally in the solid area and can block the passageway from gas flow on its own; the rest of the annular structure 640 is open but with horizontal solid partitions as before. Neither the open structured portion of baffle 640 nor the solid cylindrical baffle 630 can block gas flow on their own, but when aligned with one another they can do so in the passageway. Thus, the store must use a minimum of three active layers for thermal transfer at any one time in this example. The advantage of setting a minimum number of active layers is that the length of cylindrical baffle 630 can be kept to a minimum. For example, if a store needed between 3 and 10 layers for the thermal front to occupy, if annular baffle structure 640 did not have a solid portion corresponding in length to 3 sections/layers 650 of the storage media, then cylindrical baffle 630 would have to protrude out the equivalent of 7 layers above the top of the store when only 3 layers are required for the thermal front (i.e. region of active thermal transfer) at the start of charging (instead of protruding out only 4 layers above). This keeps the overall height of the store down.

Figure 9:
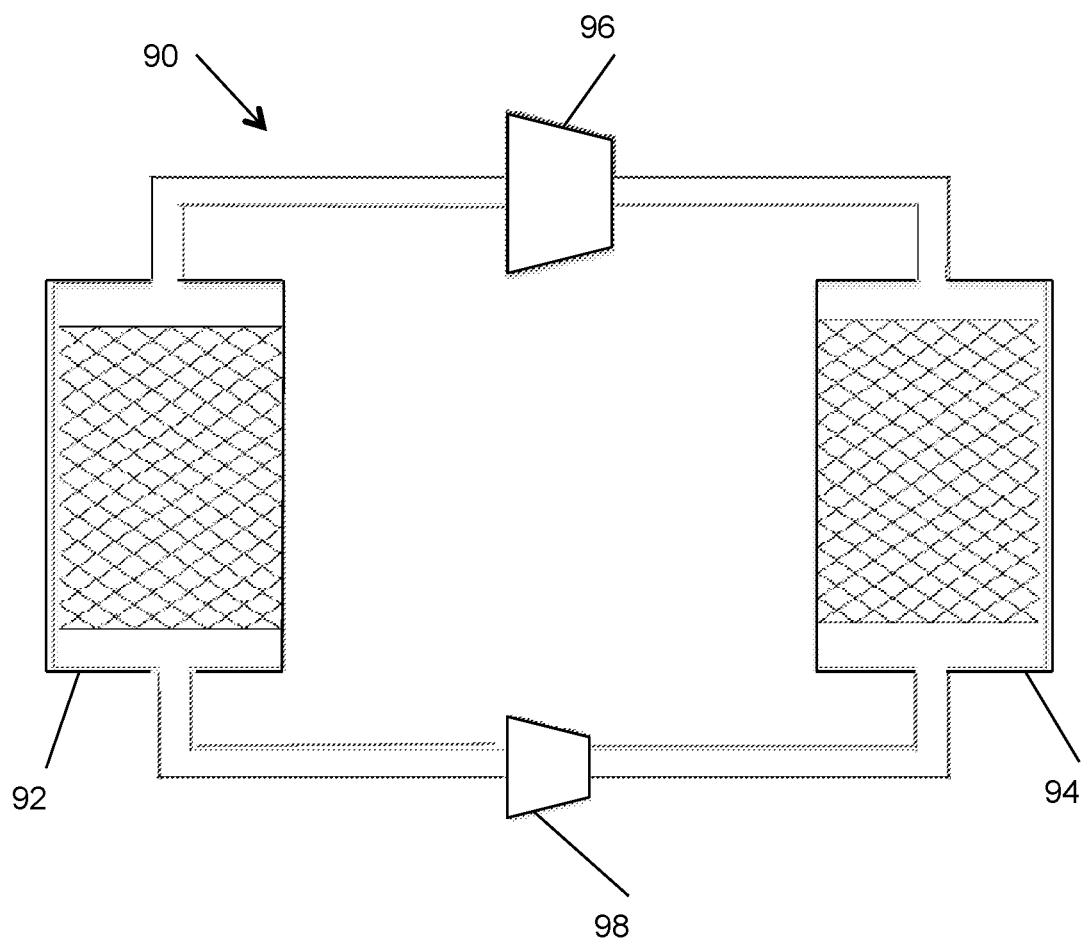
FIG. 9 is a schematic illustration of a pumped heat electricity storage system; and, FIG. 10 illustrates the formation of a thermal front in a thermal store.
Figure 10:
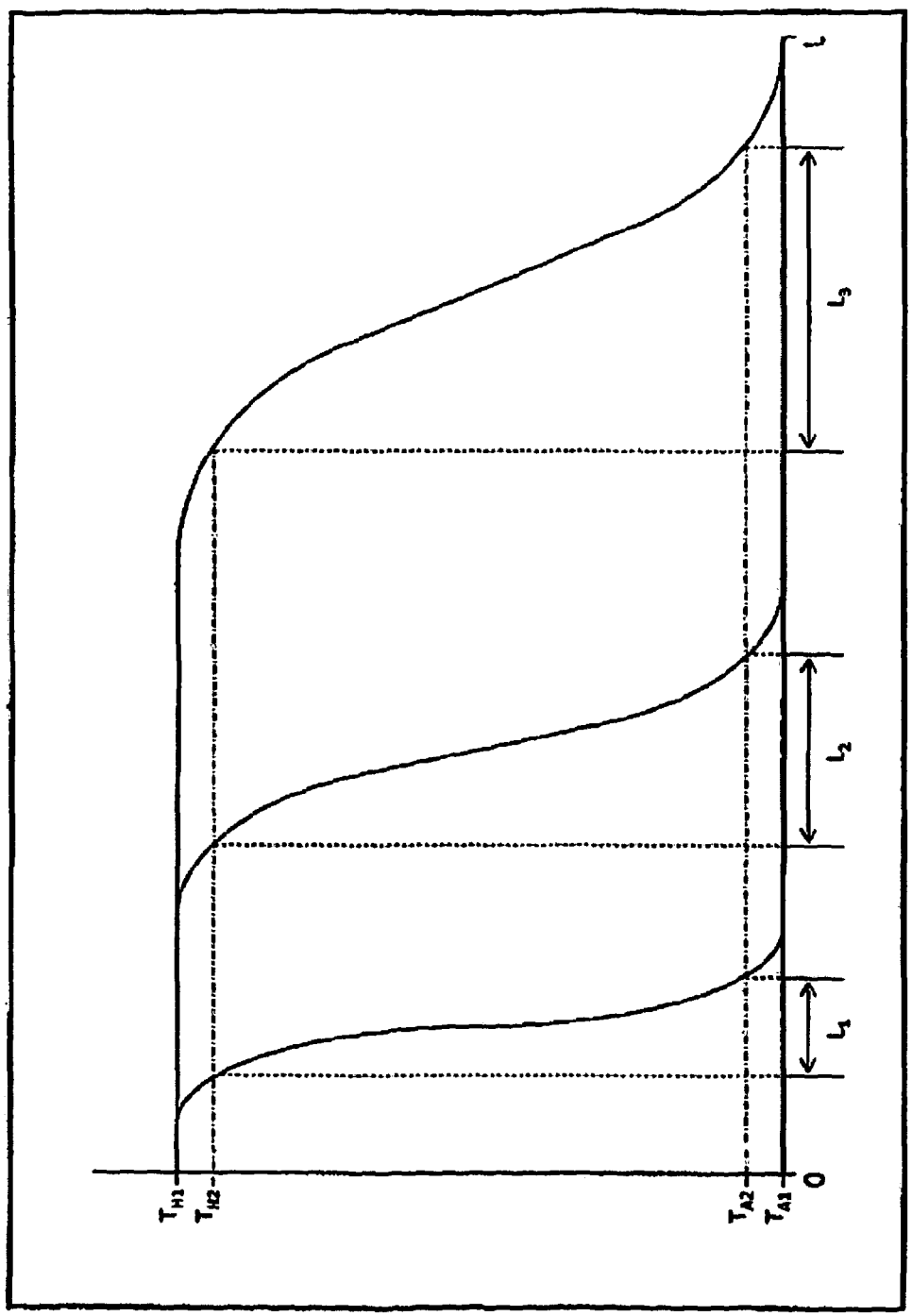

An example of a reversible system 90 in which thermal storage apparatus 92, 94 according to the invention may be used is illustrated schematically in FIG. 9. The system is a pumped heat storage system, as described in Applicant's earlier patent application WO 2009/044139, and is a reversible system operable in a charging mode to store electrical energy as thermal energy, and operable in a discharging mode to generate electrical energy from the stored thermal energy. The system comprises respective positive displacement devices acting as compressor 96 and expander 98, respectively, as well as a high pressure (hot) store 94 and a lower pressure (cold) store 92. During the charging phase, one device 96 compresses low pressure gas and the pressurised gas then passes through the high pressure store 94, where it loses its heat before being re-expanded in the other device 98 and passing at a lower pressure through the lower pressure store 92 where it gains heat and returns to the start of the circuit at its original temperature and pressure. In discharge mode, the positive displacement devices and the hot and cold stores are required to reverse their functions, so that for example, the charged hot store has cooler gas reentering at a cool inlet (which was previously the outlet).

The reversible system may conduct a full charging cycle or a full discharging cycle, or may reverse its function at any point of charging or discharging; for example, if electricity is required by the national grid a charging cycle may be interrupted and the stored thermal energy converted to electrical energy by allowing the system to start to discharge.

The system may also need to remain in a charged, uncharged or part charged state for periods of time. In that regard, the use of an insulating layer interposed between respective downstream layers will assist in preserving the profile/characteristics of the thermal front. Where operation ceases after a full charging or discharging cycle, it may be preferable to use ancillary thermal stores to "park" the thermal front, as mentioned above.

In this reversible system, the gas may be air or an inert gas such as nitrogen or argon. By way of example, the hot store may operate at a gas pressure of about 12 bar with Argon and a temperature range of 0 to 500° C., and the cold store may operate at near atmospheric pressure and a temperature range of 0 to −160° C.

It will be appreciated that the improved heat storage system incorporating a packed bed or porous media for heat transfer from a gas to a solid, where different sections of the store or stores are used in turn to create an improved thermal storage system, may have better heat transfer and/or reduced overall pressure drop. It will be appreciated that the thermal store may be designed so that only a small section is active at any one time i.e. has gas passing through it.

The invention claimed is:

1. Heat storage apparatus comprising at least one thermal store comprising a chamber having a gas inlet and a gas outlet provided at respective ends and a gas-permeable thermal storage media disposed therebetween so that a gas follows a gas flow path lengthwise through the storage media along the chamber from the gas inlet to the gas outlet,
   wherein the storage media is divided into separate spaced respective downstream layers along the length of the chamber capable of being selectively isolated from or exposed to the gas flow path,
   the apparatus being configured such that, during operation, the flow path of a gas flowing through the chamber from inlet to outlet for transfer of thermal energy to or from the storage media can be selectively altered depending upon progression of a thermal front within the storage media that is progressing along the length of the chamber, and wherein, during operation, the flow path of the gas is altered to bypass layers of the storage media within the chamber that are downstream of the thermal front.

2. Heat storage apparatus according to claim 1, wherein the chamber is provided with at least one main flow passageway extending alongside the storage media and with one or more flow controllers capable of selectively altering the gas flow path within the main flow passageway so as to alter the flow path in the storage media.

3. Heat storage apparatus according to claim 2, wherein the apparatus is configured, during operation, to divert the gas flow path from the gas flow passageway to different downstream regions, in turn, of the storage media.

4. Heat storage apparatus according to claim 2, wherein only a single main flow passageway is provided connecting the gas inlet to the gas outlet and comprising a central passageway extending lengthwise along the chamber through the storage media.

5. Heat storage apparatus according to claim 2, wherein minor flow passageways extend laterally away from the main flow passageway at a plurality of respective downstream positions along the length of the main flow passageway, permitting lateral gas flow through the storage media.

6. Heat storage apparatus according to claim 2, wherein plenums are provided extending laterally away from the main flow passageway at a plurality of respective downstream positions along the length of the main flow passageway, permitting lateral gas flow through the storage media.

7. Heat storage apparatus according to claim 2, wherein a main flow passageway is obstructed by a flow controller of the one or more flow controllers comprising at least one baffle system adapted to move along and block the passageway so as to divert a gas flow path into or out of the storage media.

8. Heat storage apparatus according to claim 7, wherein the baffle system is adapted to block the passageway so as to divert a gas flow path into the storage media at an upstream face of the baffle system.

9. Heat storage apparatus according to claim 8, wherein the positions of the respective upstream and downstream faces are independently adjustable wherein the baffle system is adapted to block the passageway so as to permit a gas flow path to emerge from the storage media at a downstream face of the baffle, and wherein the positions of the respective upstream and downstream faces are independently adjustable.

10. Heat storage apparatus according to claim 7, wherein the baffle system is adapted to block the passageway so as to permit a gas flow path to emerge from the storage media at a downstream face of the baffle.

11. Heat storage apparatus according to claim 1, further comprising a control system for selectively altering the gas flow path.

12. Heat storage apparatus according to claim 1 comprising an upright chamber with one or more substantially vertical main flow passageways extending lengthwise along the chamber, the apparatus being arranged such that the gas inlet is provided at the top of the chamber where it is set up as a hot inlet or at the bottom of the chamber where it is set up as a cold inlet.

13. Heat storage apparatus according to claim 12, wherein the thermal storage media is arranged in respective substantially horizontal thermal storage layers capable of being selectively exposed to or isolated from the gas flow path.

14. Heat storage apparatus according to claim 1, wherein the gas flow path is altered via movement of one or more flow controllers.

15. A method of operating heat storage apparatus comprising at least one thermal store comprising a chamber having a gas inlet and a gas outlet provided at respective ends and a gas-permeable thermal storage media disposed therebetween, wherein gas follows a gas flow path lengthwise through the storage media along the chamber from the gas inlet to the gas outlet for transfer of thermal energy to or from the storage media, wherein the storage media is divided into separate spaced respective downstream layers along the length of the chamber capable of being selectively isolated from or exposed to the gas flow path,
   and the flow path of the gas is selectively altered dependent upon progression of a thermal front within the storage media that is progressing along the length of the chamber, and wherein, during operation, the flow path of the gas is altered to bypass layers of the storage media within the chamber that are downstream of the thermal front.

16. The method according to claim 15, wherein, during operation, the flow path is altered to bypass regions of the storage media upstream of the thermal front, in which regions thermal transfer is substantially complete.

17. The method according to claim 15, wherein:
during operation, the flow path is altered in a first alteration to bypass regions of the storage media upstream of the thermal front, in which regions thermal transfer is substantially complete;
during operation, the flow path is altered in a second alteration to bypass regions of the storage media downstream of the thermal front, in which regions thermal transfer is minimal; and
the flow path is altered such that the flow path only passes through a region of the storage media localised around the thermal front.

18. The method according to claim 17, wherein the first and second path alterations are carried out independently of one another.

19. The method according to claim 15, wherein the gas flow path is altered via movement of one or more flow controllers.

20. Heat storage apparatus comprising:
one or more flow controllers; and
at least one thermal store comprising a chamber having a gas inlet and a gas outlet provided at respective ends and gas-permeable thermal storage media disposed therebetween so that a gas follows a gas flow path lengthwise through the storage media along the chamber from the gas inlet to the gas outlet,
wherein the storage media is divided into separate spaced respective downstream layers along the length of the chamber capable of being selectively isolated from or exposed to the gas flow path via movement of the one or more flow controllers,
the apparatus being configured such that, during operation, the flow path of a gas flowing through the chamber from inlet to outlet for transfer of thermal energy to or from the storage media can be selectively altered, via the movement of the one or more flow controllers, depending upon progression of a thermal front within the storage media that is progressing along the length of the chamber, and wherein, during operation, the flow path of the gas is altered to bypass layers of the storage media within the chamber that are downstream of the thermal front.

* * * * *